United States Patent [19]

Masseron et al.

[11] Patent Number: 4,907,768
[45] Date of Patent: Mar. 13, 1990

[54] TELESCOPING CRANE

[76] Inventors: Alain O. F. Masseron, 15 rue Collet, Palaiseau, France, 91120; Jean-Pierre M. Lavalou, 1636 Arteique Rd., Topanga, Calif. 90290

[21] Appl. No.: 73,282

[22] Filed: Jul. 14, 1987

[30] Foreign Application Priority Data

Feb. 25, 1987 [FR] France .................................. 87 02480

[51] Int. Cl.⁴ ............................................ B66C 23/72
[52] U.S. Cl. ................................ 248/123.1; 248/280.1; 212/197
[58] Field of Search .................. 248/123.1, 364, 242.1, 248/280.1; 182/2, 208, 63, 62.5; 354/81, 82, 293, 295; 352/243, 195; 212/195-198, 191, 231; 254/362

[56] References Cited

U.S. PATENT DOCUMENTS

| 669,232 | 3/1901 | Case | 198/813 |
| 799,625 | 9/1905 | Berthelot | 212/198 X |
| 1,877,373 | 9/1932 | Cohen | 212/197 |
| 1,913,040 | 6/1933 | Pierson | 198/813 X |
| 2,368,268 | 1/1945 | Spiegel | 212/197 X |
| 2,893,299 | 7/1959 | Moir | 212/195 X |
| 2,978,115 | 4/1961 | Bestel | 212/197 |
| 3,750,895 | 8/1973 | Durand | 212/48 |
| 3,788,585 | 1/1974 | Massenon | 248/123.1 X |
| 3,947,144 | 3/1976 | Elliot | 408/235 |
| 4,231,551 | 11/1980 | Ikeda | 254/362 X |
| 4,648,647 | 3/1987 | Patton | 212/195 X |

FOREIGN PATENT DOCUMENTS

| 3334428 | 11/1985 | Fed. Rep. of Germany . | |
| 1154723 | 4/1958 | France | 212/196 |
| 1415329 | 9/1965 | France . | |
| 1492931 | 8/1967 | France . | |
| 1580387 | 9/1969 | France | 212/267 |
| 1100222 | 6/1984 | U.S.S.R. | 212/197 |
| 1088226 | 10/1967 | United Kingdom . | |
| 1286610 | 8/1972 | United Kingdom . | |
| 1393349 | 5/1975 | United Kingdom . | |
| 2134072 | 8/1984 | United Kingdom | 212/267 |

Primary Examiner—Alvin C. Chin-Shue
Attorney, Agent, or Firm—Lyon & Lyon

[57] ABSTRACT

A crane having a plurality of telescoping beams for supporting and positioning a camera or the like. The crane includes a counterweight structure which balances the crane about its fulcrum point. As the beams of the crane telescope outward, the movement of the counterweight structure is controlled so as to move in the opposite direction relative to the fulcrum point to substantially maintain a balanced crane.

41 Claims, 17 Drawing Sheets

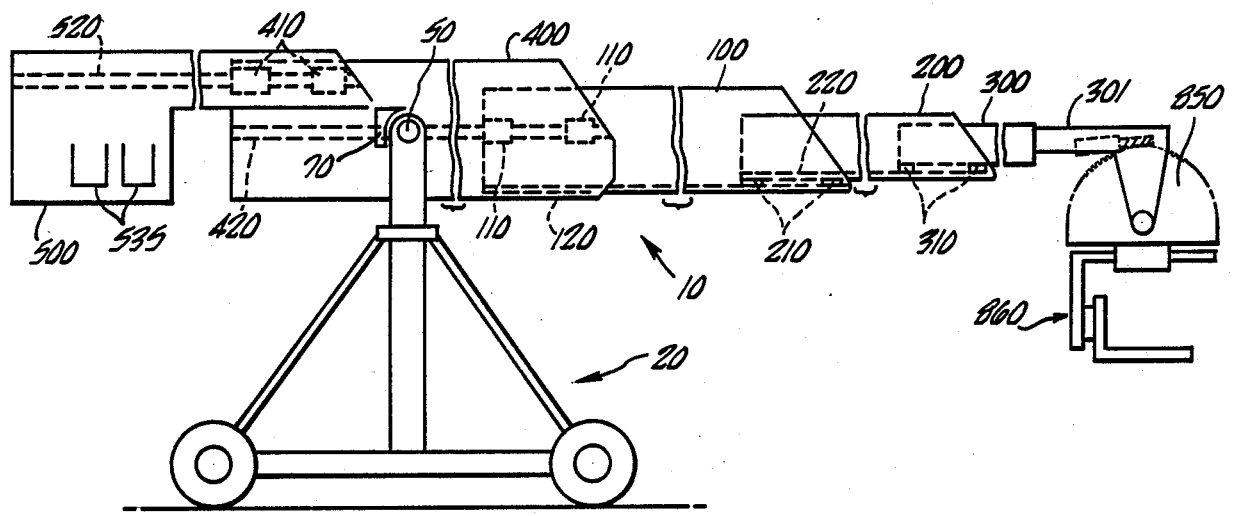
FIG_2.
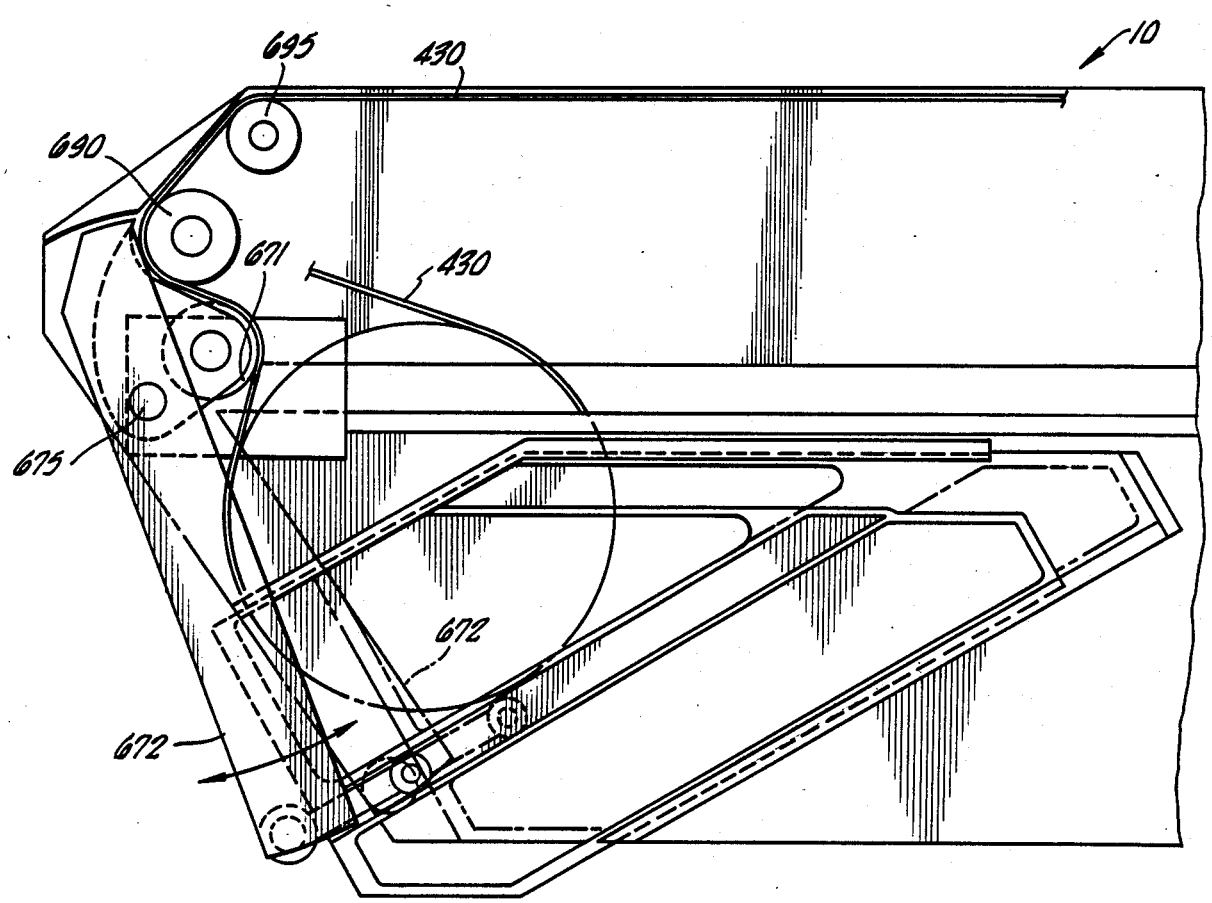
FIG_14.

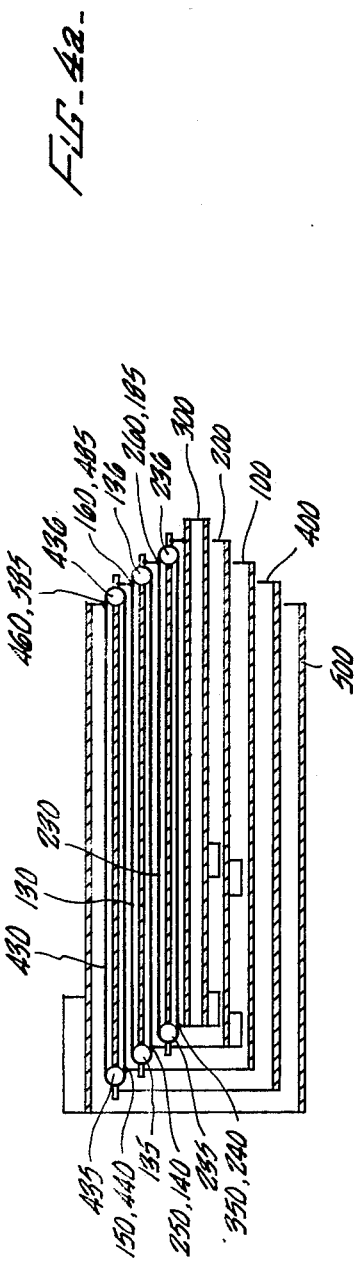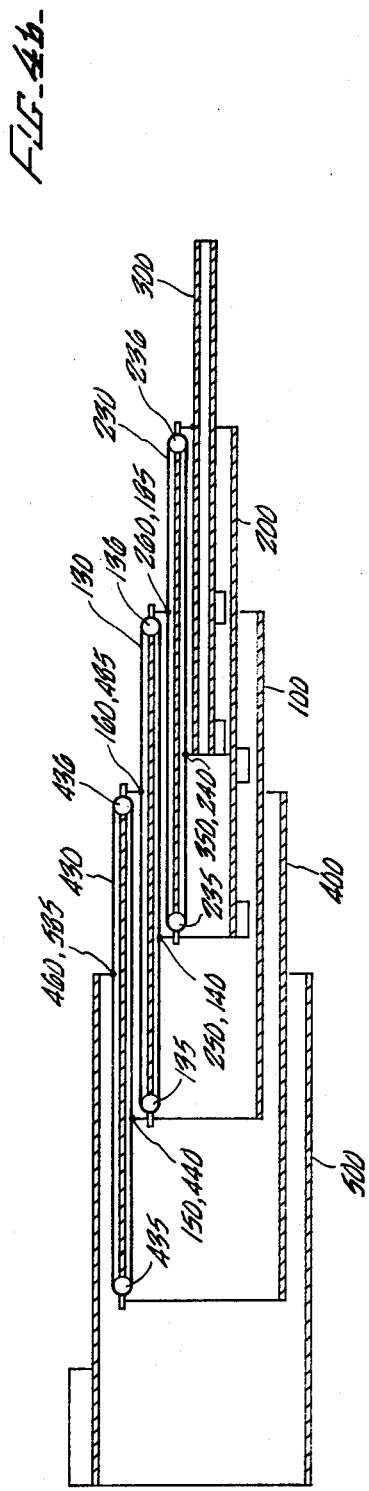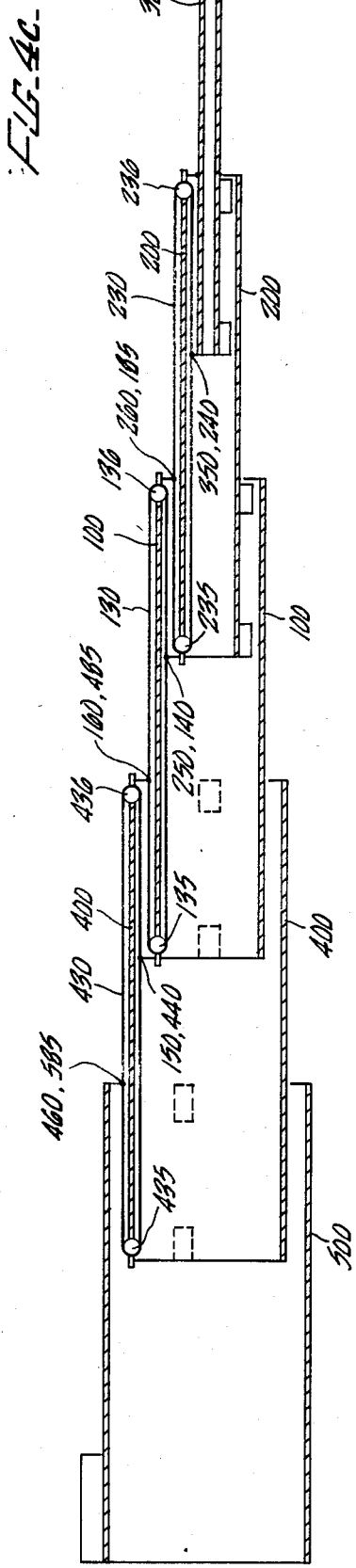

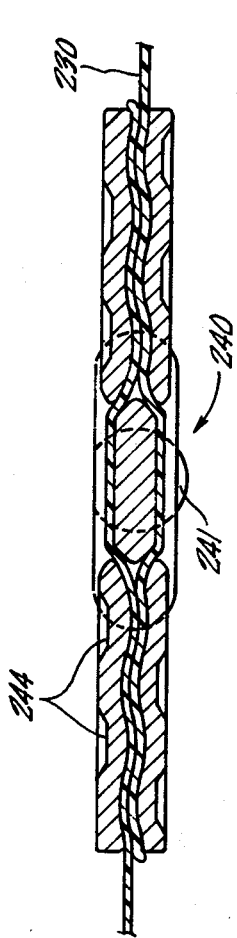
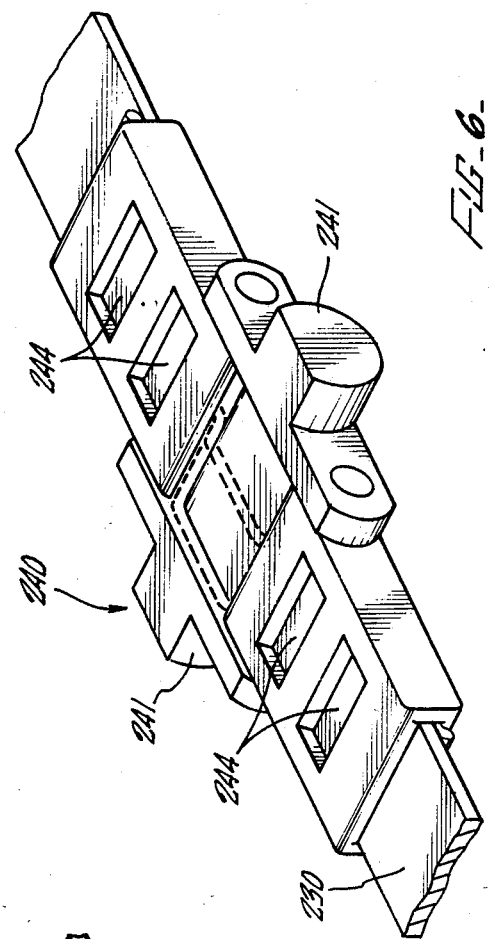
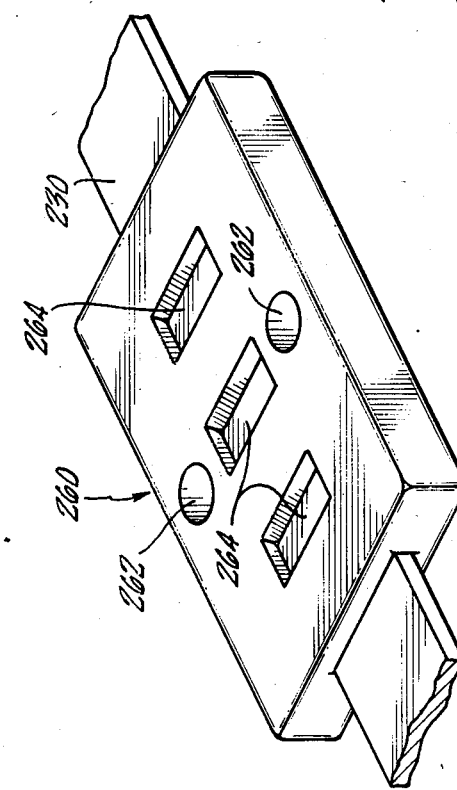

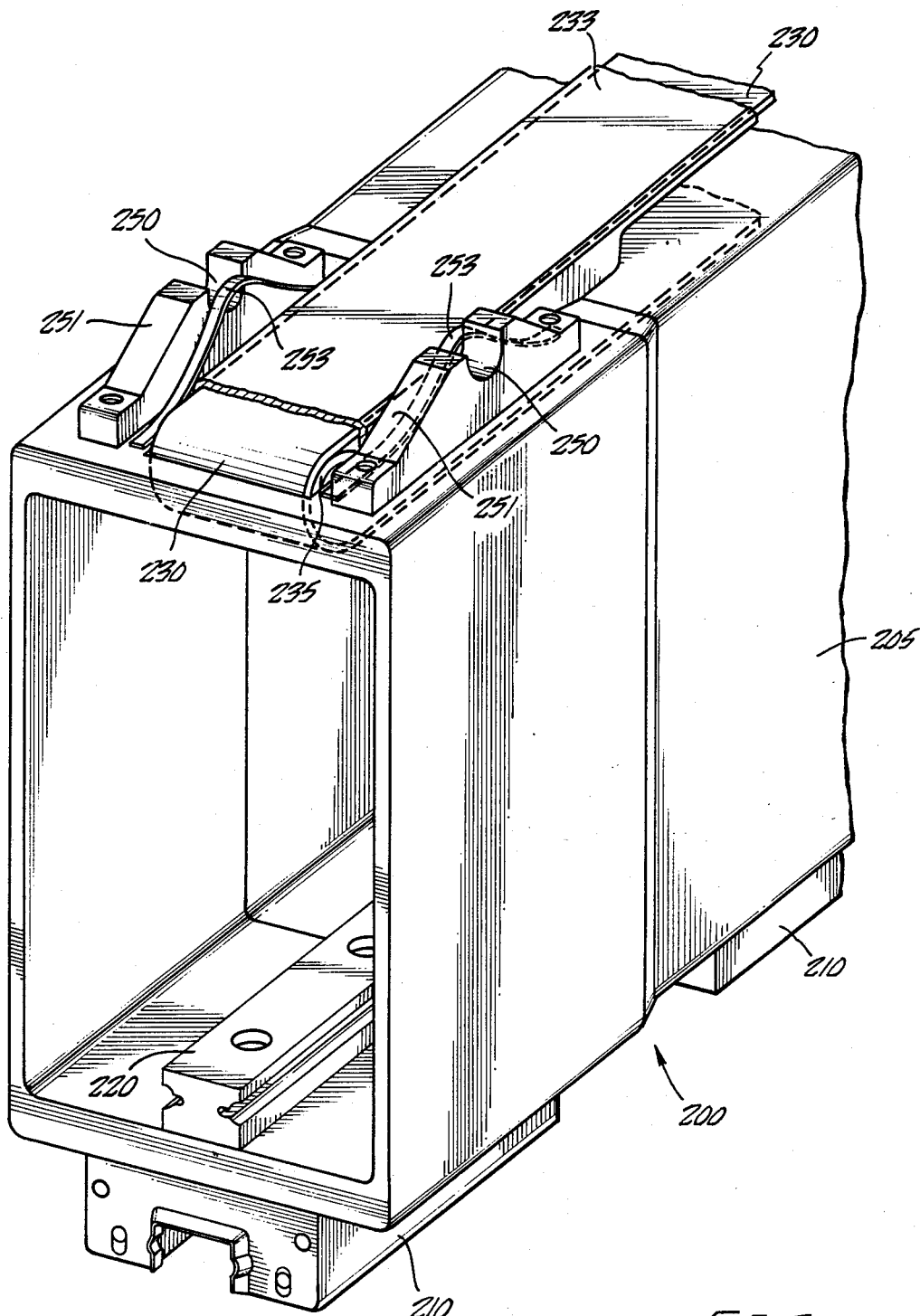
FIG_2

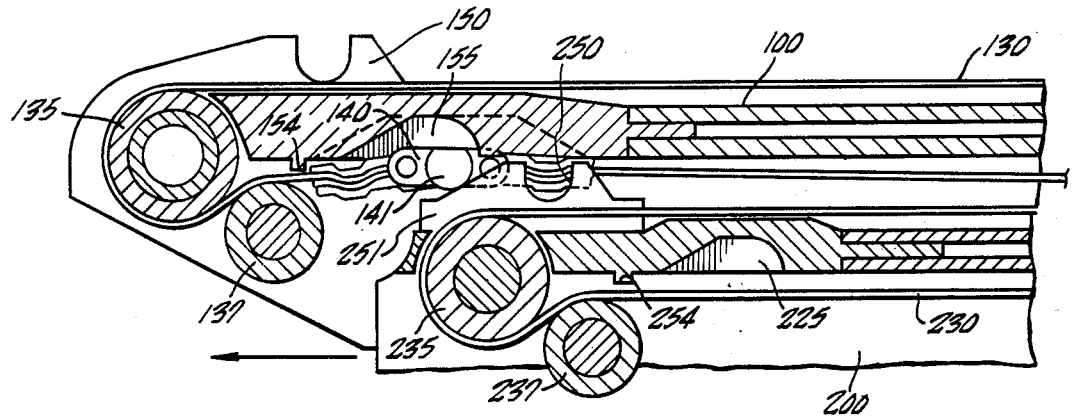
FIG_8a_
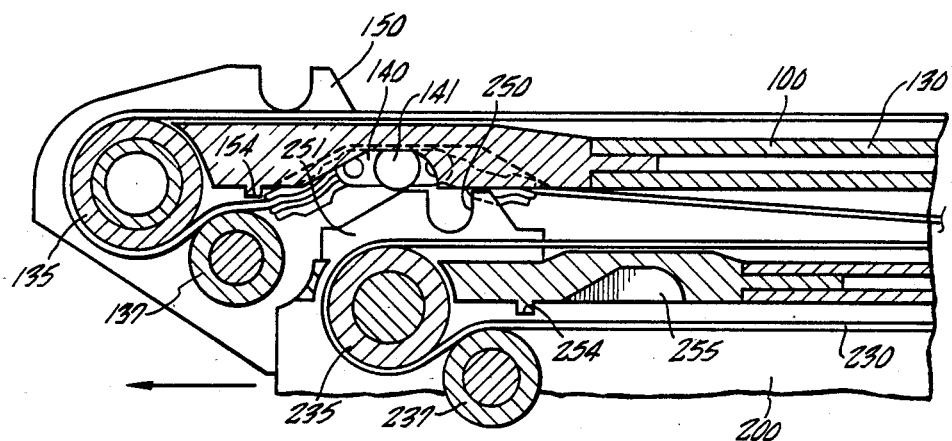
FIG_8b_
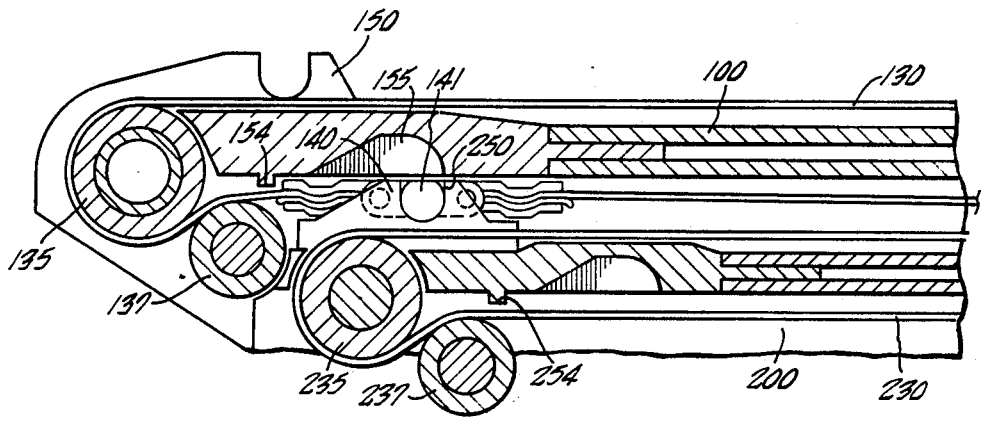
FIG_8c_

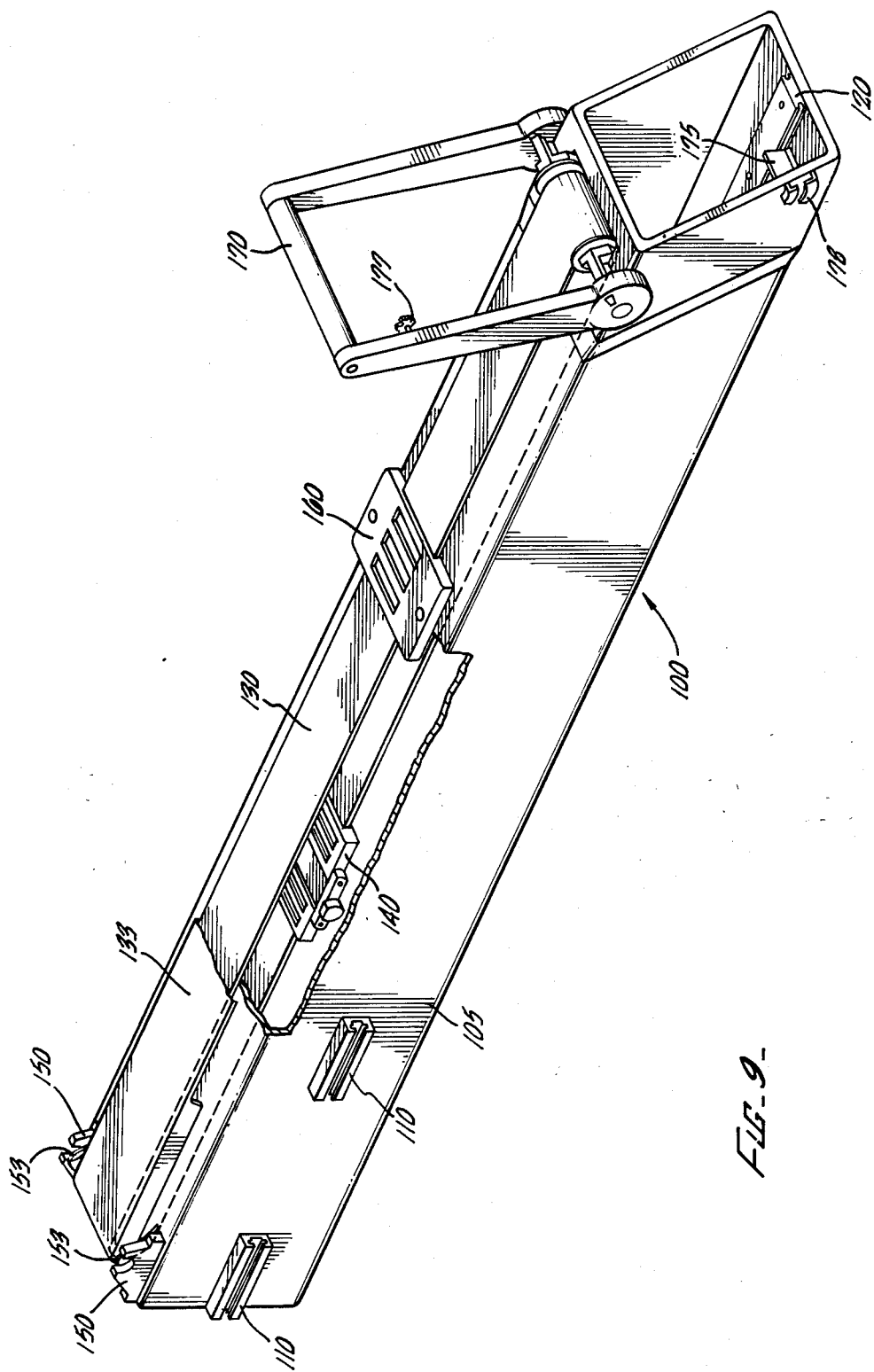

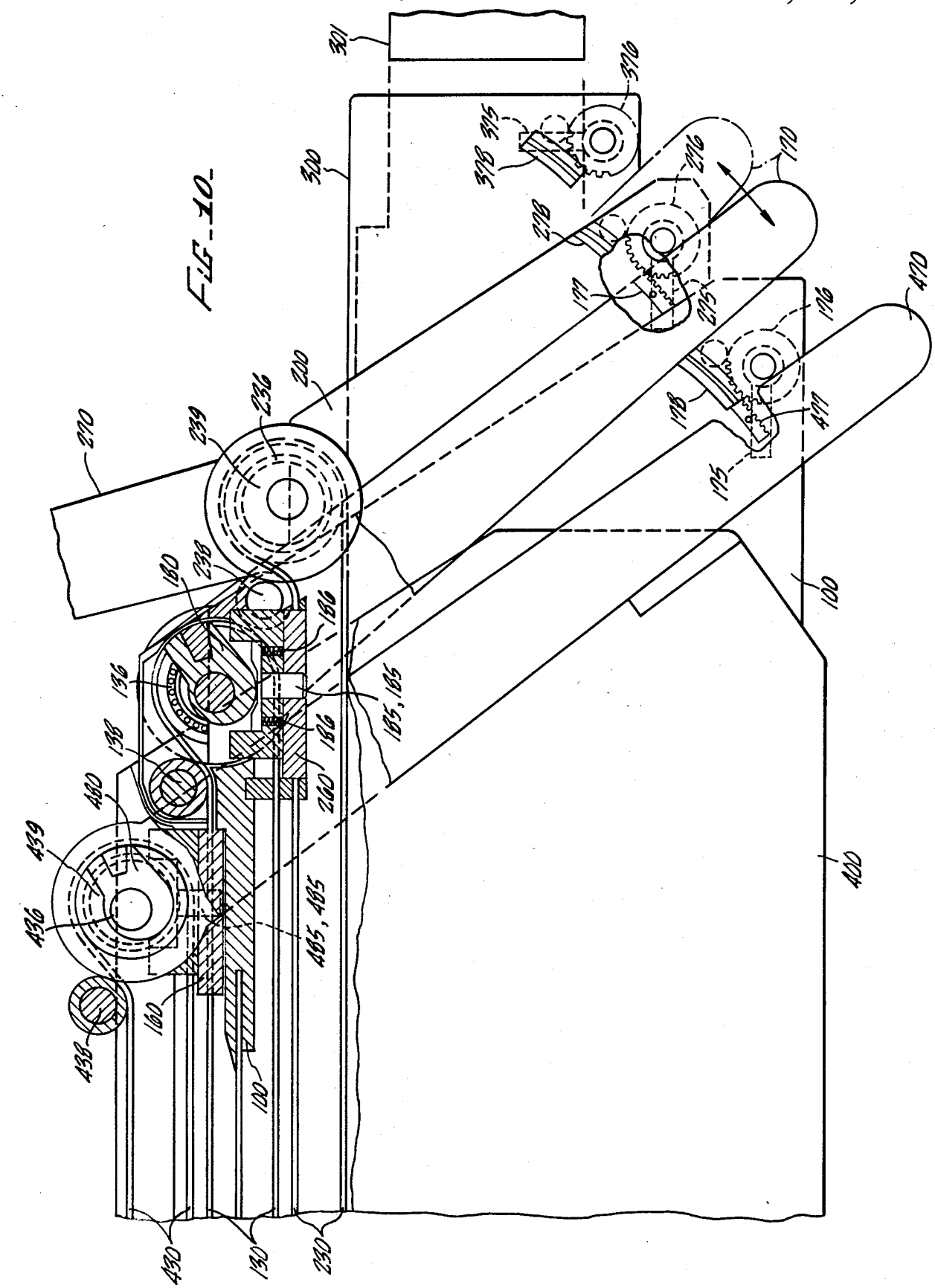

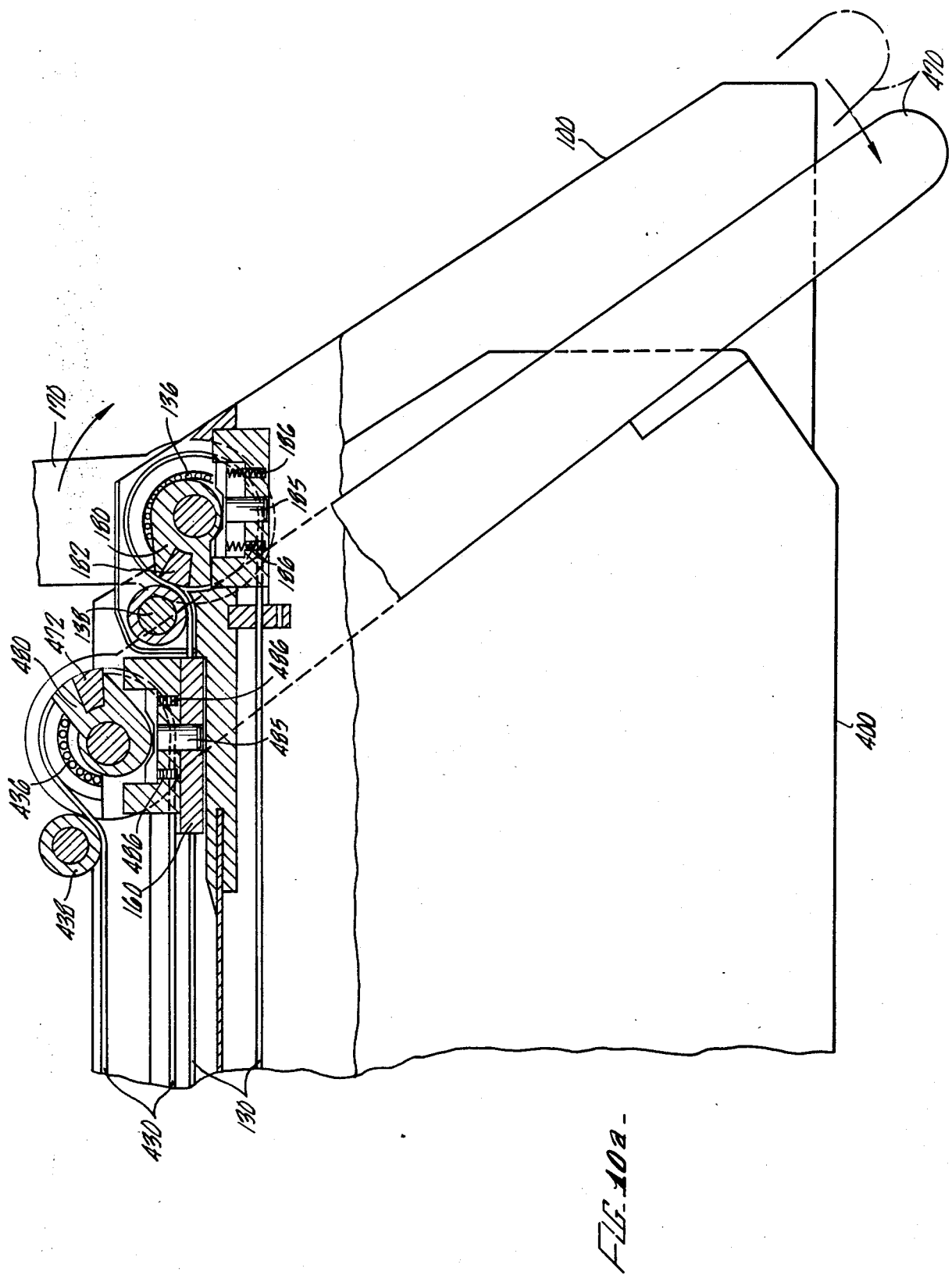

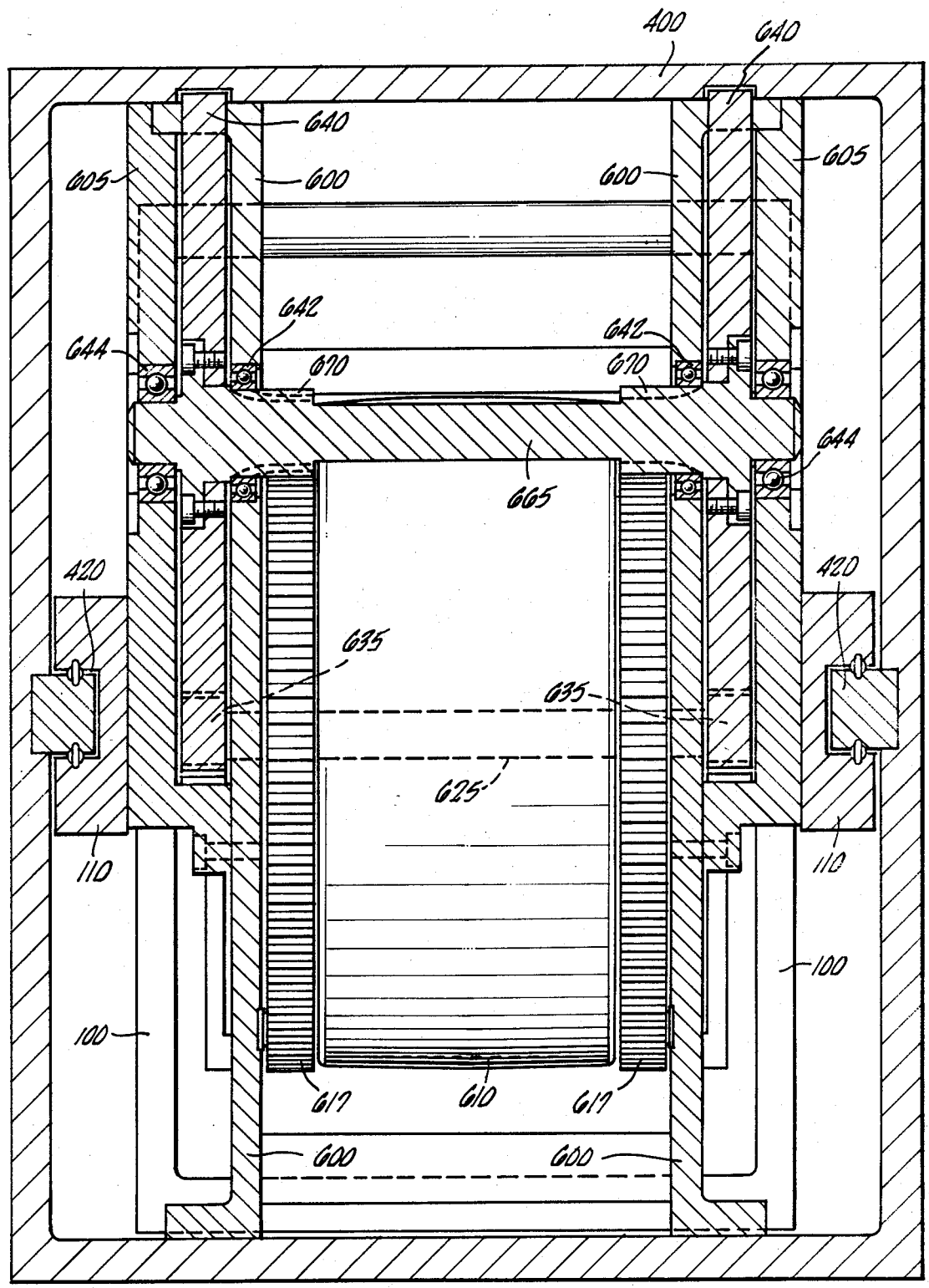
FIG_13

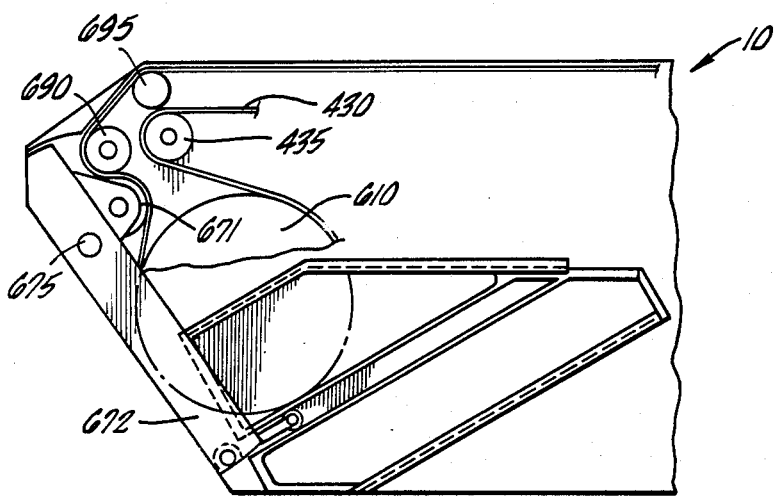
FIG_14a_
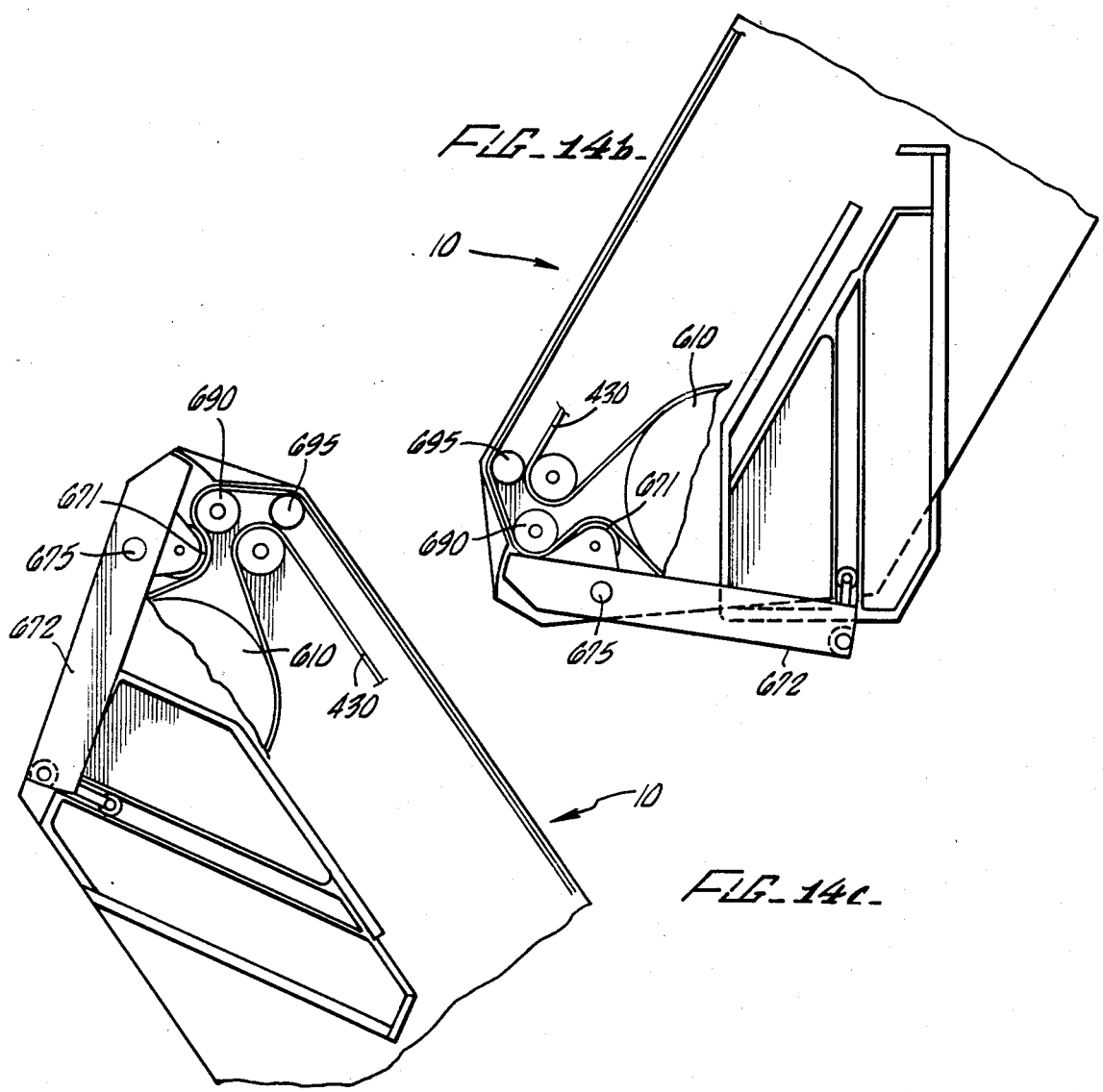
FIG_14b_
FIG_14c_

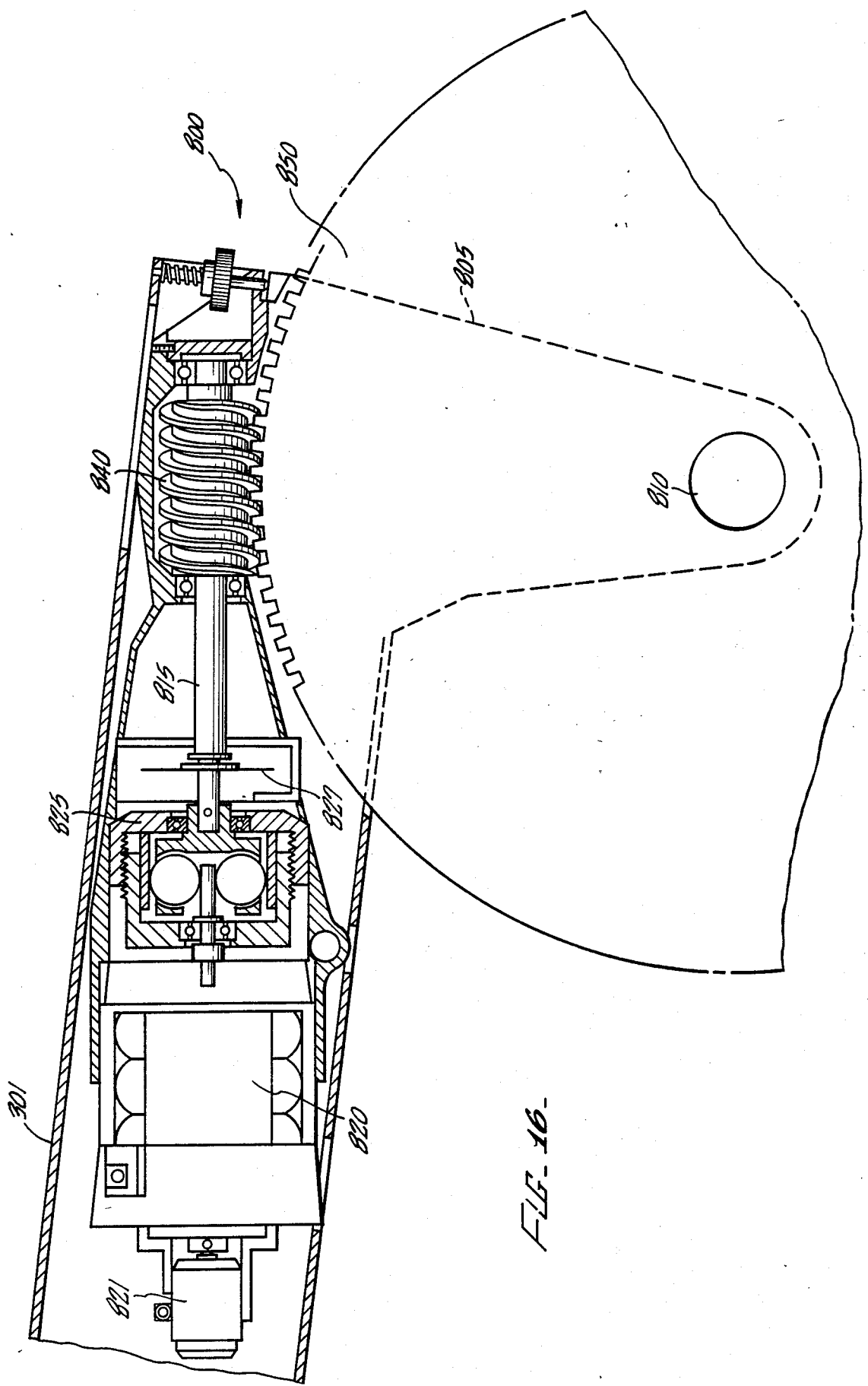

TELESCOPING CRANE

BACKGROUND OF THE INVENTION

The field of the present invention generally relates to cranes for moving and supporting objects, but is particularly related to the field of support, positioning and movement of motion picture and video cameras.

For many years film crews have needed to position and support their cameras from increasingly difficult locations to provide the desired camera angle and special effects. Frequently, the position at which the camera support must be located has limited access and space. At times the camera must be supported from awkward and extended positions. Other times the camera support, such as during a live performance, must be as unobtrusive as possible. A crane that is readily dismantable and easily assembled, preferably without any special tools, by a film crew will also achieve desired economical transportation and use. It is also desirable to have a crane, which when dismantled, has components which are light and easily carried to difficult to reach locations (such as up stairs).

When a load is carried on the end of the crane, some sort of support mechanism must be used to support that load. Whenever a load is extended outward, an increasing tilting moment is exerted on the crane's base. Means employed to compensate for this tilting moment include: extension of feet to stabilize, guy wires and counterweights.

SUMMARY OF THE INVENTION

The present invention is directed to a crane for supporting and positioning a camera or the like. More specifically, the crane may be extendable and have a means for automatically counterbalancing itself about its support while extending.

The preferred embodiment of the crane has a main center boom or beam which is pivotally mounted on a support. The main center beam has a front end and a rear end. A plurality of beams telescope outward from the front end of the main center beam. The camera or other object is mounted on the outermost beam. A counterweight structure extends out from the rear end of the main center beam. As the beams of the crane telescope outward, the counterweight structure moves in the opposite direction relative to the fulcrum point to substantially maintain a balanced crane. Once the crane is initially set up and balanced, that is, balanced with equal moments about its fulcrum point, the crane remains substantially balanced whether the crane is telescoping outward or tilting in the upward or downward direction.

The crane is preferably easily assembled and dismantled. To accomplish this object, the preferred embodiment of the crane is a plurality of telescoping beams which consecutively slide within each other and extend outward. An interconnecting means between the beams is releasable to permit disassembly.

The angular deviation experienced by the camera at the end of the crane when the crane is tilted in the upward or downward direction may be automatically compensated for by detecting the angular deviation of the crane at the fulcrum point and applying that same deviation of the crane at the camera support on the end of the crane.

The present invention may also provide a dynamically counterbalanced crane. Since the extending mechanism moves the beams and camera in one direction and simultaneously moves the counterweight structure in the opposite direction, the drive mechanism which telescopes the beams does not need to counteract the force of gravity not only when the crane is horizontal but also when the crane is tilted in the upward or downward position.

Accordingly, it is an object of the present invention to provide a crane for positioning and supporting a camera or the like. Other and further objects and advantages will also become apparent from the drawings and the descriptions herein.

BRIEF DESCRIPTION OF THE DRAWINGS

FIG. 2 illustrates the crane in a fully extended position.

FIGS. 4a, b, c diagrammatically illustrate beam mechanisms with their interconnected straps according to the preferred embodiment. FIG. 4a illustrates the beams in a fully retracted position, FIG. 4b illustrates the beams in a partially extended position, and FIG. 4c illustrates the beams in a fully extended position.

FIG. 5 illustrates details of an upper pin connector for the straps of FIGS. 4a-c.

FIG. 6 illustrates a lower pin assembly for the straps of FIGS. 4a-c.

FIG. 6a is a cross section of the lower pin assembly of FIG. 6.

FIG. 7 is a perspective view of the rear end of a typical beam of the crane.

FIGS. 8a-c illustrate the connecting mechanism for the rear ends of the typical camera beams.

FIG. 10 is a cross section of the belt tensioning mechanism.

FIG. 10a is a detailed cross section of the belt tensioning mechanism during partial crane assembly.

FIG. 12 and 13 are partial cross sections of the driving mechanism shown in FIG. 11.

FIGS. 14 and 14a-c diagrammatically illustrates the strap tension compensating mechanism shown in FIG. 11: FIG. 14 illustrates the motion of the mechanism; FIG. 14a illustrates the crane in the horizontal position; FIG. 14b illustrates the crane in an upward tilted position; and FIG. 14c illustrates the crane in a downward tilted position.

FIG. 16 illustrates the camera stabilizing mechanism.

DETAILED DESCRIPTION OF THE PREFERRED EMBODIMENT

Details of the present invention will now be described with reference to the drawings. An element numeral identifying an element in one figure represents the same element in any other figure.

Figure 1:
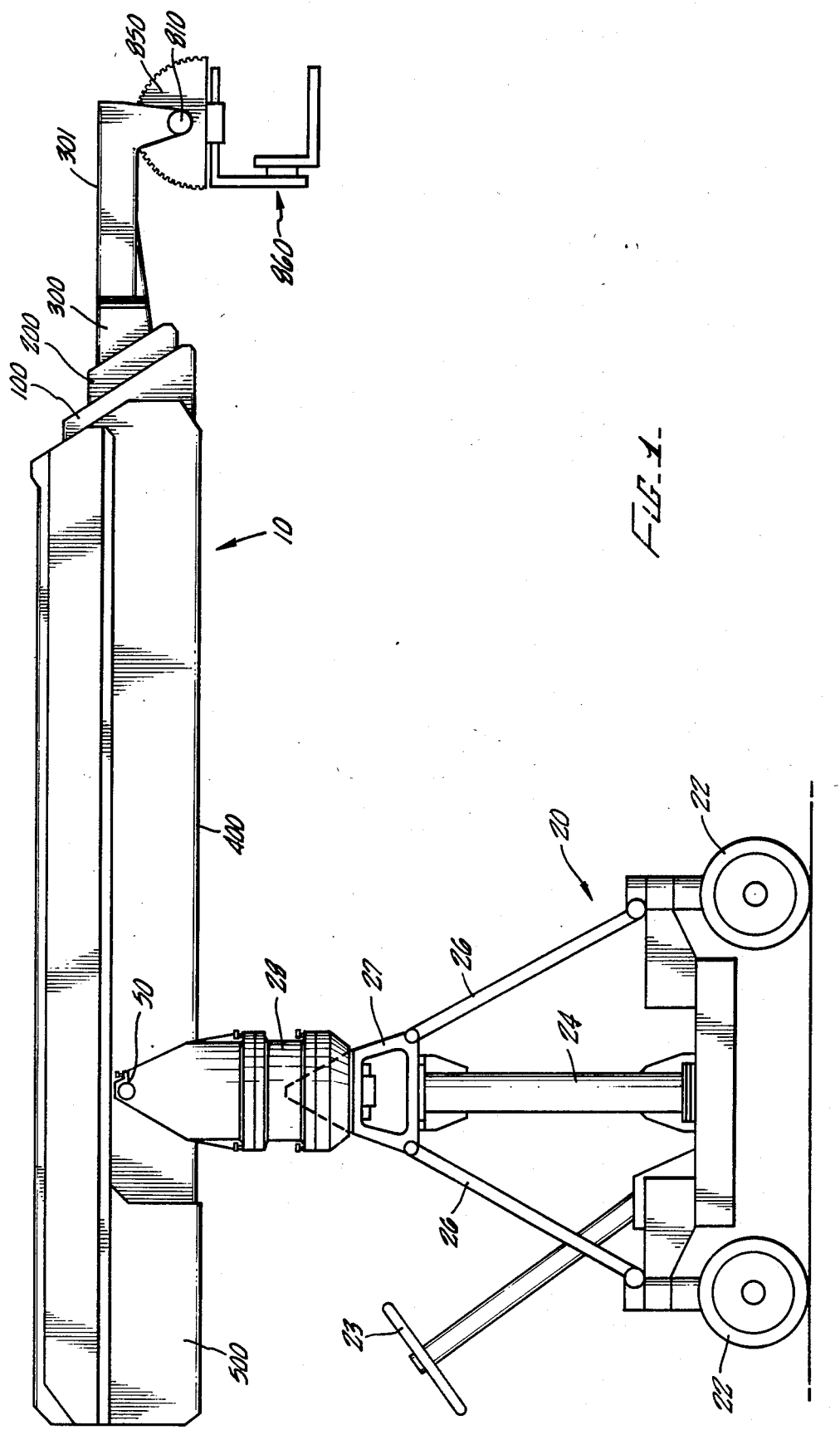
FIG. 1 diagrammatically illustrates a crane in the fully retracted condition.

FIGS. 1 and 2 show a crane 10 pivotably mounted on a rolling cart or dolly 20. The dolly 20 has wheels 22 which may roll along a rolling track permitting movement of the entire crane. The dolly 20 is steered by a steering wheel 23. Cart 20 has a main stand 24 and support stands 26,26 supporting a high hat 27 which carries a rotable head 28. Alternately the crane 10 could be suspended from an overhead support or held by other support systems. The rotatable head 28 supports crane 10 at fulcrum 50. Crane 10 is comprised of a main center beam or boom 400 which is mounted to rotable head 28 at fulcrum point 50. Telescopingly connected to main center beam 400 are counterweight structure 500, first camera beam 100, second camera beam 200, and third camera beam 300. A camera mount 301 is attached to third camera beam 300. On the end of camera mount 301 is mounted a gear 850 pivoting on pivot point 810. An adjustable mounting head 860 is attached to the bottom of gear 850. Camera mount 301 may be rotated 180° about the axis of third camera beam 300 to position the mounting head 860 above the camera mount 301. FIG. 1 illustrates crane 10 in a fully retracted position.

FIG. 2 shows further details of crane 10 in a fully extended position. The bearing and guideway system of crane 10 will now be described referring to FIGS. 2 and 3. Though the sliding arrangement is preferably accomplish by use of linear bearings and guideways (suitable vendor is identified below) other sliding arrangements may be used such as a roller scheme. Third beam 300 has linear bearings 310,310 attached on the outer bottom thereof. Linear bearings 310,310 track along guideway 220 which is attached to the inside bottom of second beam 200. Guideway 220 is centered on the bottom of second camera beam 200 and extends the length of beam 200. Similarly, linear bearings 210,210 attached to the outer bottom of second beam 200 track along a guideway 120 which is attached to the inside bottom of first camera beam 100. Guideway 120 is centered on the bottom of first camera beam 100 and extends the length of beam 100. Main center beam 400 has two guideways 420,420 running along the inner sides thereof. Guideways 420,420 each engage a pair of linear bearings 110,110 connected to each outer side of first camera beam 100. The guideways 420,420 are approximately centered on the inner sides of main center beam 400 and extend the length of the beam 400. First camera beam 100 is supported by two sets of bearings 110,110 on each side thereof because of the heavier load that it must carry. Alternately, if linear bearings were designed such that they were capable of supporting the heavier load with an orientation along the bottom of the beam such as bearings 210,210 on second camera beam 200, a single pair of bearings could be located on the bottom of first camera beam 100 to track along a single guideway attached to and extending the length of the inside bottom of main center beam 400.

One alternate bearing combination could have the guideways and linear bearings located on the top of the various beams. Another alternate bearing combination is envisioned locating a pair of guideways on the inner sides of second camera beam 200 and first camera beam 100 with corresponding linear bearings on the outer sides of third beam 300 and second beam 200.

Figure 3:
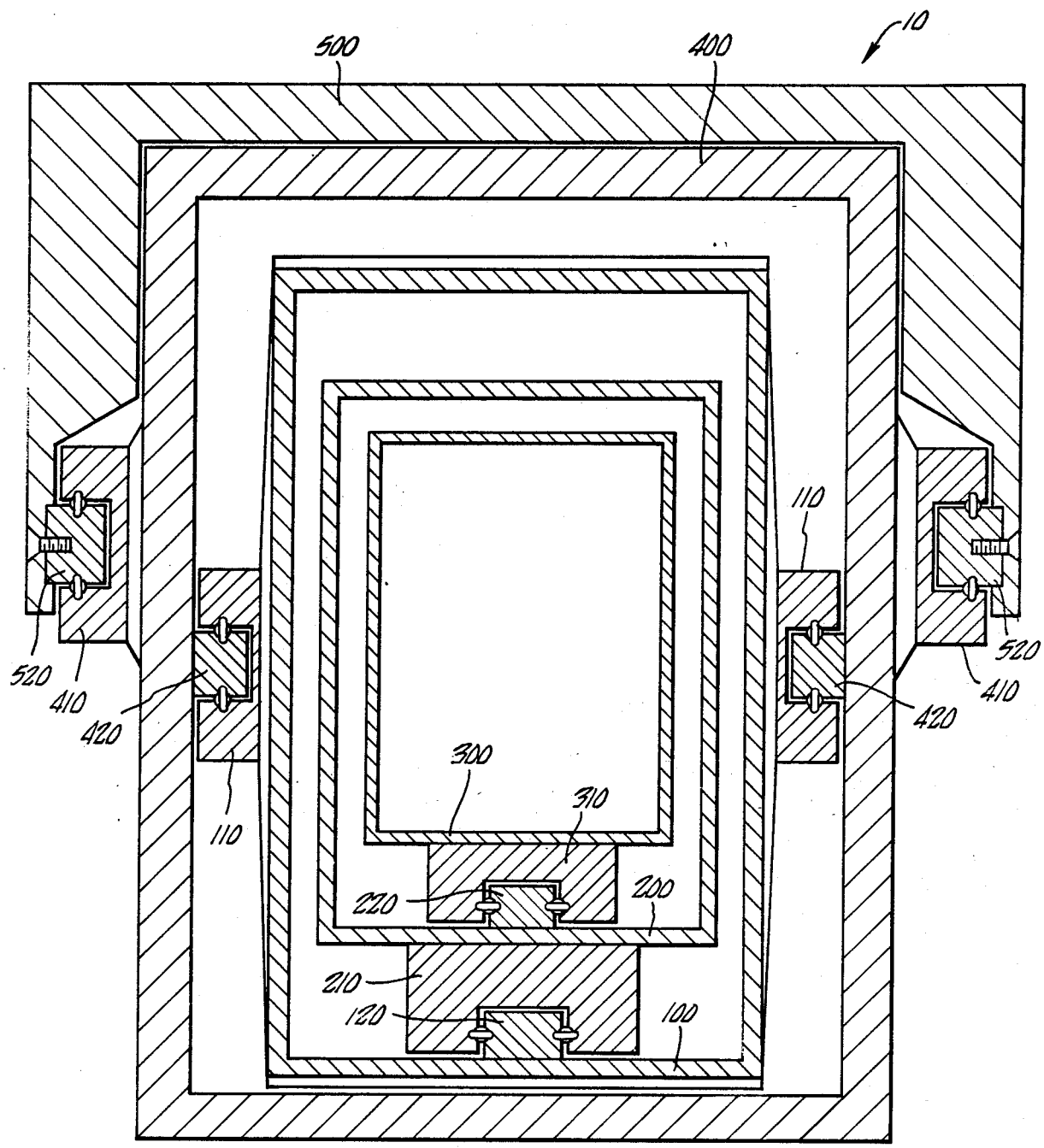
FIG. 3 illustrates a partial cross section of the crane in FIG. 1 showing the beams and the support mechanisms.

Though a dual guideway system may provide superior lateral stability, the single guideway system avoids problems of misalignment. The single guideway (for example the bottom positioned guideway 120 as shown in FIG. 3) design is the preferred design because of the difficulty in keeping the two guideways accurately parallel in a dual guideway design (for example the side positioned guideways 420,420 as shown in FIG. 3). To further ensure proper alignment, one of the two guideways in a dual guideway design may have a lateral "floating" attachment.

Several advantages are realized by locating the bearing assemblies as described above including (1) superior weight distribution and (2) protection of components. Adjacent beams are in a relative carrying/carried combination. For example, with respect to camera beams 200 and 100, camera beam 200 is a carried beam relative to beam 100 and beam 100 is a carrying beam relative to beam 200. Similarly, with respect to beams 300 and 200, beam 300 is the carried beam and beam 200 is the carrying beam. Though the positions could be reversed, the preferred arrangement is to locate the linear bearing 310, 210, 110 on the carried beams 300, 200, 100 and the guideways 220, 120, 420 on the respective carrying beams 200, 100, 400.

The linear bearings 310, 210, 110 are lighter than the guideways 220, 120, 420. When crane 10 telescopes outward, each carried beam slides outward with respect to its carrying beam. Since the lighter linear bearings 310, 210, 110 are on the carried beams and the heavier guideways 220, 120, 420 are on the carrying beams, the heavier crane components remain closer to the fulcrum point 50. This arrangement results in bringing the overall mass of the crane 10, when telescoping, closer to fulcrum point 50 thereby minimizing stress.

The guideways 220, 120, 420 are also more fragile than the linear bearings 310, 210, 110 but always remain protected inside their respective beam 200, 100, 400 even when the crane 10 is disassembled. Additionally, when assembled, the linear bearings 310, 210, 110 on the carried beams 300, 200, 100 always remain protected inside the corresponding carrying beams 200, 100, 400. With the addition of suitable sealing means such as a bellows unit at the inner faces between the beams, the bearings 310, 210, 110 and guideways 220, 120, 420 may be further protected from environmental factors such as dust or rain as may be encountered at a filming location.

Additionally the beams may be provided with a spring loaded cover which snaps into place automatically upon dismantling thereby covering the openings of the beams giving the guideways 220, 120, 420 inside even further protection. The snap on covers protect the guideways 220, 120, 420 from external factors during assembly and when the components of crane 10 are disassembled.

The counterweight structure 500 as illustrated in FIGS. 1-3 has an open U-shape carrying its two guideways 520, 520 on its inner sides. Linear bearings 410, 410 are located on each side of main center beam 400 for supporting guideways 520, 520 and counterweight structure 500. Counterweight structure 500 straddles main center beam 400 and has a shorter height (along its camera end) than main center beam 400 as best viewed in FIG. 1. The counterweight structure 500 may then slide along bearings 410, 410 clearing fulcrum point 50. Counterweight structure 500 has side holders 535, 535 which accommodate lead weights used to balance the crane 10. The side holders 535, 535 are designed to accept lead weights in only one specific manner to position the center of gravity of the weights at a specific point within side holders 535, 535.

The cross sections of the beams 400, 100, 200, and 300 have been shown to be rectangular in shape, but other shapes such as circular, oval or U-shaped are envisioned.

The telescopically extendable structure of the beams allows all mechanisms, including those of support and control, to be housed within these hollows beams. This advantage provides a very clean and sleek appearance for the crane 10 by not having any external appurtenances such as guy wires or power cords. Although the preferred shape is to have a hollow center space for the mechanisms, a telescopic action could still be accomplished for example with beams stacked one on top of the other and still be telescopically extendable from a main beam. Telescopically extendable therefore should not be taken to limit the crane to only a series of carrying/carried beam wherein a carried beam slides within and extends out from its respective carrying beam though such an embodiment is preferred.

The relative telescoping action of the beams is controlled by an interconnecting means. The preferred interconnecting means is a series of closed loop flexible linkages. Such a linkage may be comprised of a chain or metal wire, but the preferred linkage is the flexible belt system which is diagrammatically illustrated in FIGS. 4a, 4b and 4c. FIG. 4a shows the crane in a fully retracted position, FIG. 4b shows the crane in a partially extended position, and FIG. 4c shows the crane in a fully extended condition. Relative beam position is dictated by a series of closed loop belts or straps 230, 130, 430 wrapped around the top wall of their respective beams 200, 100, 400.

Beam 200 has a closed loop strap 230 wrapped around its top wall. The closed loop strap 230 revolves around pulleys which are preferably needle bearing rollers 235, 236 which are located at each end of beam 200. The outer surfaces of needle bearing rollers 235, 236 are preferably provided with a coating which will protect strap 230 from frictional damage such as due to slippage. The coating may also create a convex shape on the roller surface to assist in maintaining a centered position of strap 230.

A closed loop strap 130 is wrapped around the top wall of beam 100 and revolves around rollers or needle bearings 135,136 located at each end of the beam 100. Closed loop strap 430 is wrapped around the top wall of main center beam 400 and revolves around needle bearings 435,436. The belt drive mechanism for strap 430 is not shown in FIGS. 4a, 4b, 4c and will be described later. Each strap 230, 130, 430 is fitted with a bottom connecting element such as lower pin assemblies 240, 140, 440 and a top connecting element such as upper pin connectors 260, 160, 460. When the crane 10 fully assembled, lower pin assembly 240 is attached to the rear end (i.e., the end nearest counterweight structure 500) of third camera beam 300 at cradle 350 and upper pin connector 260 is attached by pins 185 to the front end (i.e., the end nearest the camera mount 301) of first camera beam 100. Lower pin assembly 140 is attached to the rear end of second camera beam 200 at cradle 250 and upper pin connector 160 is attached by pins 485 to the front end of main center beam 400. Lower pin assembly 440 is attached to the rear end of first camera beam 100 at cradle 150 and upper pin connector 460 is attached by pins 585 to the front end of counterweight structure 500.

When any strap or beam is moved, a chain reaction occurs, due to the connections described above, in which all the beams move relative to each other.

For example, as strap 430 on main center beam 400 is rotated (by the drive mechanism to be described later) counterclockwise, the following reactions simultaneously occur: (a) counterweight structure 500 moves rearward, (b) first camera beam 100 is moved forward, (c) strap 130 is rotated counter-clockwise, (d) second camera beam 200 is moved forward, (e) strap 230 is rotated counter-clockwise and (f) third camera beam 300 is moved forward. The purpose of this complex relative movement is to achieve a crane which is automatically counter balanced. Analyzing the relative movement of the beams shows that the crane is indeed automatically counter balanced. Calling the distance "d" the distance that the top pin 460 of main center beam 400 travels (which is also the distance that counterweight structure 500 travels) then first camera beam 100 travels a distance of "d", second camera beam 200 travels a distance of "2d", and third camera beam 300 travels a distance of "3d". In other words, each carried beam moves a distance "d" from its respective carrying beam.

As the camera is attached to the end of third beam 300 on camera mount 301, this means that when counterweight structure 500 moves any distance, the camera will move three times the same distance. The geometric balance of the system will now be specifically analyzed. The variables are defined as follows:

M = mass of the counterweight structure 500
D = distance of the center of gravity of the counterweight structure 500 to the fulcrum point 50
$m_1$ = mass of first camera beam 100
$m_2$ = mass of second camera beam 200
$m_3$ = mass of third camera beam 300
m = mass of camera mounted on end of third camera beam 300 (which would include camera mount 301 and mounting head 860 as shown in FIG. 1)
$d_1$ = distance of center of gravity of first camera beam 100 to fulcrum point 50
$d_2$ = distance of center of gravity of second camera beam 200 to fulcrum point 50
$d_3$ = distance of center of gravity of third camera beam 300 to fulcrum point 50
d = distance of center of gravity of camera and camera mount 301 to fulcrum point 50
$\Delta d$ = change of distance to the fulcrum point 50 of the center of gravity of the counterweight structure 500 at a time t.

If at an instant $t_o$ the entire structure is balanced, by adding appropriate weights to the end of counterweight structure 500, then the sum of the moments are equal on each side of the fulcrum point 50 expressed by the equation (for simplification, the main center beam 400 is assumed to be balanced):

$$MD = m_1 d_1 + m_2 d_2 + m_3 d_3 + md \qquad (1)$$

At an instant "t" the counterweight structure 500 and first camera beam 100 have each moved a distance of $\Delta d$; second camera beam 200 has moved a distance of $2\Delta d$; and third camera beam 300 and the camera and camera mount 301 have moved a distance of $3\Delta d$.

In order for the system to remain balanced during extension of the crane, the sum of moments of the beams about the fulcrum point must stay equal as represented by the equation:

$$M(D+\Delta d) = m_1(d_1+\Delta d) + m_2(d_2+2\Delta d) + m_3(d_3+3\Delta d) + m(d+3\Delta d)$$

this equation reduces to:

$$MD + M\Delta d = m_1 d_1 + m_1 \Delta d + m_2 d_2 + 2m_2 \Delta d + m_3 d_3 + 3m_3 \Delta d + md + 3m\Delta d.$$

Since $MD = m_1 d_1 + m_2 d_2 + m_3 d_3 + md$, the equation reduces to:

$$M\Delta d = \Delta d \, (m_1 + 2m_2 + 3m_3 + 3m).$$

Therefore, the condition for equilibrium during the extension of the crane is:

$$M = m_1 + 2m_2 + 3m_3 + 3m.$$

When this condition of equilibrium is used in the original equation (1) this equation becomes:

$$(m_1 + 2m_2 + 3m_3 + 3m) D = m_1 d_1 + m_2 d_2 + m_3 d_3 + md$$

or $$D = (m_1 d_1 + m_2 d_2 + m_3 d_3 + md)/(m_1 + 2m_2 + 3m_3 + 3m). \quad (2)$$

As $m_1$, $m_2$, $m_3$, $m$, $d_1$, $d_2$, $d_3$, and $d$ are specific values depending of the specific weights and geometrical characteristics of the beams and camera, the values chosen for "M" and "D" must be a specific values. This analysis illustrates a crane design by which the balancing of the arm (symbolized in the equation: $MD = m_1 d_1 + m_2 d_2 + m_3 d_3 + md$) can be achieved for a given load (such as a camera) only with one specific value of "M" and one specific value of "D", as compared to alternate designs where the operator could have the options of obtaining infinite values for "M×D" by either more counterweights at a shorter distance from the fulcrum point or less counterweights at a greater distance from the fulcrum point 50. This balance may be achieved by a configuration of the counterweight receptacle such that for a given camera it can occupy only one specific place on the counterweight structure 500 and also by counterweight elements (such as lead weights) which can fit into the receptacle 535, 535 only in one, specific manner. The position of this receptacle has been determined carefully in order to obey the law of equilibrium. When we consider equation (2) we see that the only variable element in the equation (although it is not variable once that the crane has been balanced for one specific camera) is "m" which is affected by the weight of the camera used.

Typically, camera weights only vary in a range between 10 kg and 35 kg. This means that "D" has to be slightly changed if one has to change the camera at the end of the boom. This slight shift of "D" is minor and fluctuates, depending on the camera used, only a few millimeters.

An adjustment of the way the counterweight receptacle fits onto the counterweight structure is provided in order to make this small correction for the value of "D". As already described above, the lead weights are positioned with their centers of gravity at a specified point within the side holders 535, 535. A clearly visible index may be located at the interface between the counterweight receptacles 535, 535 and the counterweight beam in order to help the operator properly position the receptacles 535, 535 according to the type of camera or its configuration.

An additional advantage is achieved with respect to the telescoping action of the crane 10 when it is tilted in the up or down positions. Forces acting on the strap 430 of the main center beam 400 (that is, the force due to counterweight structure 500 and the force due to the reaction of beam 300, 200, 100 and the camera mount 301 and the camera) stay substantially equal and opposite at every angular position. Since these forces are substantially equal at each angular position, the only forces which the telescopic moving mechanism must overcome are: (1) the forces due to friction and (2) the force of inertia required to accelerate the various masses in the system.

First camera beam 100, second camera beam 200, third camera beam 300 and main center beam 400 are preferably made of carbon fiber material. Such a material has the desirable characteristics of strength, lightness and stiffness required for the intended use. As a light material, the carbon fiber achieves lower stresses on the structure and bearings which is important to an extending crane application. The stiffness is also desirable in order to maintain a level camera during extension of the crane. Beams of carbon fiber are available from various companies including: CompositAir, Inc., Newbury Park, Calif.; or MOC, Lesigny, France; or Cape Composites, Inc., San Diego, Calif.

Since the main center beam 400 is attached at fulcrum point 50, it has mass on both sides of the fulcrum point 50. Consequently, the main center beam 400 is preferably counter balanced by itself by having equal moments about the fulcrum point 50 which is positioned at the center of gravity of main center beam 400. Since it does not move when the crane 10 is telescoping, minimizing the overall weight of the main center beam 400 is not as important as minimizing the weight of the camera beams 100, 200, 300. While the first, second and third camera beams 100, 200, 300 and main center beam 400 are preferably made of carbon fiber material, main center beam 400 is optionally made from aluminum.

An aluminum main center beam 400 may be heavier than one made of carbon fiber, but it may have cost and durability advantages. Still, the carbon fiber material is preferred because on disassembly, the lighter carbon fiber material would be more easily carried and assembled by the camera crew.

Though only carbon fiber material and aluminum have been specifically described as a material of construction for the beams, alternate suitable materials may be considered. For example, the beams 100, 200, 300, 400 may all be made from aluminum or alternately from various types of alloys or composite materials or combinations thereof, preferably possessing the desired properties of light weightness and stiffness.

Typical telescoping industrial cranes have a set of roller bearings at the front and at the back of each beam in order to take the stress due to the leverage of the different masses. The present invention uses linear bearings and guideway assemblies. Suitable linear bearings and guideway assemblies are available from vendors such as INA; Walzlager Schaeffler KG, Postfach 1220, D-8522 Herzogenaurach, West Germany. Further details of linear bearings and guideway assemblies are available from INA and other suitable vendors.

The straps 230, 130, 430 are preferably made from high strength, low density synthetic aramid fiber sold by DuPont under the trademark Kevlar ® 49 and available from Samuel Roche Company, Saint Etienne, France. Pound for pound, an aramid fiber strap is more fracture resistant than steel. Straps 230, 130, 430 are held in place by pairs of needle bearings 235 & 236, 135 & 136, and 435 & 436. The needle bearing size is actually dictated by specifications due to minimum rolling diameter required by the aramid fiber strap rather than the load. Such a needle bearing choice results in an oversized needle bearing which can handle high maximum stress. For example, a suitable size of the needle bearing chosen to accommodate the minimum rolling diameter of the aramid fiber strap is rated for 7200 kilograms (15840 pounds) at 17,000 rpm when in fact this needle bearing will be subjected to a maximum stress of 1,000 kilograms (2200 pounds). Such a use has a safety factor of 7.2 where a factor of 2.5 is normally considered satisfactory. Suitable needle bearings are available from vendors such as INA; Walzlager Schaeffler KG, Postfach 1220, D-8522 Herzogenaurach, West Germany.

The connecting mechanisms will now be particularly described. Though particular preferred connecting or mating elements are described, alternate suitable mechanisms are envisioned. FIG. 5 illustrates a typical top connecting element as an upper pin connector 260. Upper pin connector 260 is secured to strap 230 at crimps 264. Upper pin connector 260 has two pin holes 262, 262 extending through upper pin connector 260 on either side of strap 230. The upper pin connector 160 on strap 130 is equivalent (see FIGS. 9 & 10) to upper pin connector 260.

FIG. 6 and cross-sectional view FIG. 6a illustrate the typical bottom connecting element as a lower pin assembly 240 attached to strap 230 by crimps 244. Lower pin assembly 240 has pins 241, 241 extending outward from either side of strap 230. Pins 241, 241 are rounded on the lower side. A cross-sectional view in FIG. 6a illustrates that lower pin assembly 240 may secure two ends of strap 230 where such a strap 230 is not manufactured in a continuous belt. The lower pin assemblies 140 and 440 on straps 130 and 430 (see FIGS. 9 & 11) are of similar design to lower pin assembly 240.

FIG. 7 illustrates a rear view of a typical camera beam with particular reference to second camera beam 200. Second camera beam 200 has a body 205 as previously described preferably constructed from carbon fiber material. Bearings 210, 210 are attached to the outside bottom of beam body 205, centered on the bottom and positioned parallel the beam's axis. Guideway 220 is secured to inside bottom of beam body 205 positioned in the center and running the length of beam 200. On the top of beam 200 is strap 230 which wraps around needle bearing 235. A plastic cover 233 is positioned over strap 230 to provide both mechanical and shading protection for the aramid fiber strap 230. The aramid fiber straps may preferably be coated with an anti-abrasive polyurethane external cloth which will also provide protection both from ultraviolet light and mechanical damage.

The connective assembly mechanism using the pin cradles 250, 250 will now be described with respect to FIG. 7 and 8a-c. Pin cradles 250, 250 are located on the rear end on top of beam 200 on either side of strap 230. FIGS. 8a-c illustrate the insertion of the rear end of second camera beam 200 into first camera beam 100. First camera beam 100 has its strap 130 wrapping around needle bearing 135. Needle bearing 137 urges strap 130 upward to provide additional room for camera beam 200. Pin cradle 150 is positioned on the top of first camera beam 100. Similarly, camera beam 200 has its strap 230 wrapping around needle bearing 235. Needle bearing 237 urges strap 230 upward to provide more room for third camera beam 300 (not shown). FIG. 8a illustrates one side of lower pin assembly 140 engaging ramp 251 of pin cradle 250 as second camera beam 200 is inserted into first camera beam 100. Since there is insufficient clearance between second camera beam 200 and first camera beam 100, lower pin assembly 140 must be pushed rearward (to the left as in FIG. 8a) revolving strap 130 until lower pin assembly 140 reaches recess 155 in first camera beam 100. Strap 130 will also stop revolving when lower pin assembly 140 strikes bumper 154. Bumper 154 ensures that lower pin assembly 140 stops at the correct position. When lower pin assembly 140 reaches the correct position at recess 155, pin 141 will ride up ramp 251 on pin cradle 250 as shown in FIG. 8b until pin 141 settles into cradle 250 as illustrated in FIG. 8c. Pin 141 will only be able to ride up ramp 251 when strap 130 is in the untensioned condition. Lower pin assembly 140 will not settle into cradle 250 until strap 130 is properly tensioned (by mechanism to be described later). For dismantling purposes, leaf springs 253, 253 as illustrated in FIG. 7 are designed to release pins 141, 141 from pin cradles 250, 250 when the tension on the belt 130 is released.

The rear ends of third camera beam 300 with cradle 350 and first camera beam 100 with cradle 150 (See FIG. 11) are similar to that described for second camera beam 200.

FIG. 9 illustrates an entire first camera beam 100. The first camera beam 100 has a body 105. Strap 130 is not entirely visible since it is shielded by cover 133. On the rear end of body 105 are pin cradles 150, 150 and leaf springs 153. Guideway 120 is attached to the bottom of camera beam 100 and runs the entire length of the beam.

Figure 9A:
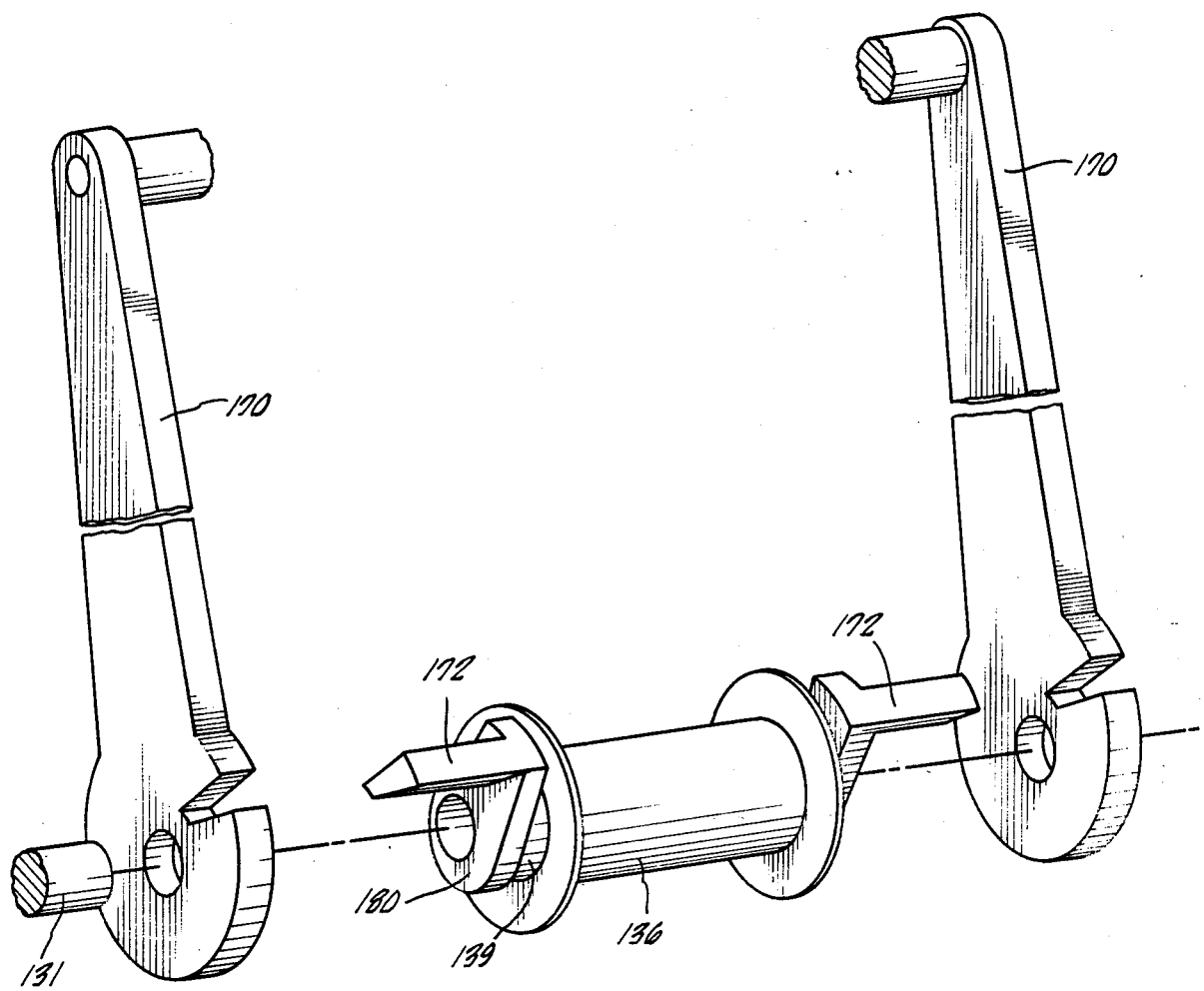
FIG. 9a is an exploded perspective view of the belt tensioning handle and mechanism.
Figure 9B:
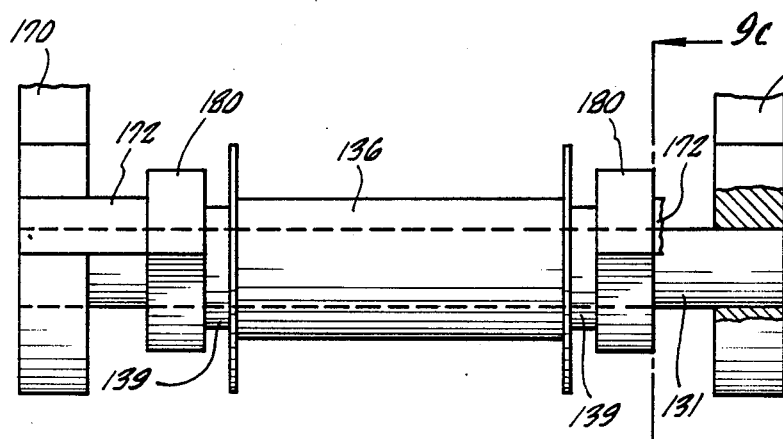
FIG. 9b is a front view of FIG. 9a and FIG. 9c is a cross sectional view of FIG. 9b.
Figure 9C:
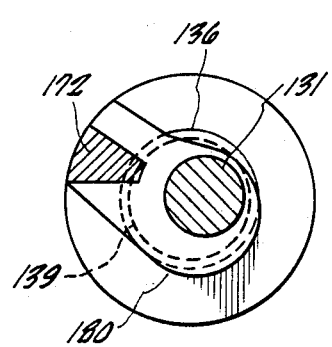
FIG. 9 illustrates a perspective view of a typical beam from the front end with its belt tensioning handle.

The belt tensioning mechanism will now be described with reference to FIGS. 9, 9a-c, 10 and 10a. Strap 130 wraps around needle bearing 136 and is urged downward by needle bearing 138. Handle assembly 170 is connected to an eccentric 139 within needle bearing 136 such that as handle 170 is pulled downward, the center axis of needle bearing 136 is moved outward thereby tensioning strap 130. The position of eccentric 139 in relation to handle 170 is such that as handle 170 is pulled downward, the tension applied to strap 130 is gradually increased until handle 170 actuates eccentric 139 to its maximum extension which is just before the handle 170 reaches its resting position. After actuating eccentric 139 past its maximum extension, handle 170 is immediately urged and secured into its resting position. On either side of needle bearing 136 are cams 180, 180 which also rotate with handle 170. As handle 170 is pulled downward, the motion of cam 180 urges pins 185, 185 downward into upper pin connector 260 thereby securing the front end of first camera beam 100 to strap 230 on second camera beam 200. FIGS. 9a-c particularly illustrate details of the strap tensioning mechanism associated with handle 170. Handle 170, eccentric 139, and cams 180, 180 rotate about a center shaft 131. Needle bearing 136 rotates about eccentric 139. Handle connectors 172, 172 connect cams 180, 180 and eccentric 139 with handle 170.

Similarly, strap 430 wraps around needle bearing 436 and is urged downward into position by needle bearing 438. Handle 470 on main center beam 400 also has an eccentric 439 which urges needle bearing 436 outward when handle 470 is pulled downward thereby tensioning strap 430. Strap 430 is tensioned as handle 470 is pulled downward by the action of eccentric 439 on needle bearing 436. Simultaneously, cams 480, 480 on either side of needle bearing 436 and connected to handle 470 push pins 485, 485 downward into upper pin connector 160 thereby securing front end of main center beam 400 to strap 130.

Strap 230 wraps around needle bearing 236 and is urged downward into position by needle bearing 238. Handle 270 on second camera beam 200 has an eccentric 239 within needle bearing 236 for tensioning strap 230 as handle 270 is pulled downward.

To insure proper assembly, first camera beam 100 has a stop 175 which is normally in the up position (refer to FIG. 9) in order to prevent insertion of second camera beam 200 unless stop 175 has been lowered.

FIGS. 10 and 10a illustrate the assembly method and strap tensioning means. Proper order of assembly is as follows: main center beam 400 is secured to fulcrum point 50 (not shown). First camera beam 100 is inserted all the way into main center beam 400. Handle 470 on main center beam 400 is pulled downward tensioning strap 430, compressing springs 486, 486 and lowering pins 485, 485 into upper pin connector 160 (simultaneously lowering pin assembly 440 into cradle 150 as in FIG. 11). Handle 470 has a small gear piece 477 on its inside face. (The gear piece 477 is equivalent to gear piece 177 on handle 170 as shown in FIG. 9.) Gear piece 477 slides into channel 178 on first camera beam 100 and engages gear 176 which is attached to stop 175. As handle 470 reaches its resting place, gear 176 is rotated downward by gear piece 477 lowering stop 175. Therefore, until handle 470 is pulled down tensioning strap 430, securing beam 100, and lowering stop 175, beam 200 cannot not be inserted into beam 100. Stop 175 does not begin lowering until handle 470 actuates the eccentric 439 past its maximum extension. Stop 175 is not completely lowered (allowing insertion of beam 200) until handle 470 reaches its proper resting place.

Once stop 175 is lowered, second camera beam 200 may be inserted into first camera beam 100. The previous procedure is repeated pulling down handle 170 which tightens belt 130 by means of eccentric 139 and lowers pins 185, 185 by means of cam 180 into upper pin connector 260 on belt 230 (simultaneously lowering lower pin assembly 140 into cradle 250 as in FIG. 11). FIG. 10a illustrates pins 185, 185 and springs 186, 186 in the extended position. As handle 170 is pulled down, gear portion 177 on handle 170 slips into gear guide 278 and engages gear 276 located in the sidewall of second camera beam 200. As gear piece 177 rotates gear 276, stop 275, which is attached to gear 276, is lowered.

With a lowering of stop 275, third camera beam 300 may then be inserted into second camera beam 200. Once third camera beam 300 is fully inserted into second camera beam 200, handle 270 may be pulled down tensioning strap 230 by means of eccentric 239 (simultaneously lowering lower pin assembly 240 into cradle 350 as in FIG. 11) As handle 270 is lowered, gear piece 277 on the inside of handle 270 slides into gear guide 378 located on the outside of third camera beam 300. Gear piece 277 then engages and rotates gear 376 located in the sidewall of camera beam 300 thereby lowering stop 375 which is attached to gear 376.

Once stop 375 is lowered, camera mount 301 may then be inserted into third camera beam 300. Camera mount 301 is firmly secured to third camera beam 300 such as by bolting. Camera mount 301 does not have any telescoping function.

This particular and specific order of assembly assures that each beam is properly secured thereby avoiding accidental disassembly during use.

FIG. 10a illustrates details of the top connecting elements of first camera beam 100 and main center beam 400. FIG. 10a illustrates first camera beam 100 fully inserted into main center beam 400. Handle 470 has been pulled downward thereby tensioning strap 430 through the rotation of eccentric 439 acting upon needle bearing 436. Also rotating with handle 470 is cam 480 which acts upon pin 485 pressing pin 485 into upper pin connector 160 thereby securing the front end of main center beam 400 to the top connecting element of beam 100. Handle 170 of first camera beam 100 is in the up, unlocked position. Strap 130 has not been tensioned by the action of eccentric 139 on its needle bearing 136. With cam 180 in the unlocked position, pin 185 is urged upward by springs 186, 186 which would permit removal of second camera beam 200 upon disassembly.

The handle of the respective carrying beam (such as handle 470 of main center beam 400) cannot be lowered into its resting position until its carried beam (first camera beam 100) is properly positioned inside. This proper position simultaneously corresponds to the position: (a) which allows gear piece 477 to slide through slot 178 (FIGS. 9 & 10), (b) where the lower pin assembly 440 is directly over its cradle 150 (FIG. 11) and (c) where the pins 485, 485 align with the holes in upper pin connector 160 (FIG. 10a).

Once the crane 10 has been assembled with camera mount 301 secured in place (such as by bolting) onto third camera beam 300, the beams 100-400 of the crane 10 are safely connected because the handles 270, 370, 470 are prevented from being released until its subsequent element is removed. Specifically, handle 270 cannot be raised because of the presence of camera mount 301, handle 170 cannot be raised because of the presence of third camera beam 300, and handle 470 cannot be raised because of the presence of second camera beam 200. Therefore camera mount 301 must first be removed first before the crane 10 may be disassembled.

Though the preferred design of the top connecting element is the upper pin connector 260 as described in FIG. 5, one alternate design could be a connecting means similar to the cradle and pin assembly of the bottom connecting element 240 illustrated in FIG. 6 and described above. The alternate design will then have a fork (in place of pins 185, 185) straddling over the alternate connector to provide appropriate connection. This alternate connecting element design is also the preferred method of connecting element 585 of the counterweight structure 500 to a top connecting element 460 on strap 430 (see FIG. 4a).

Figure 11:
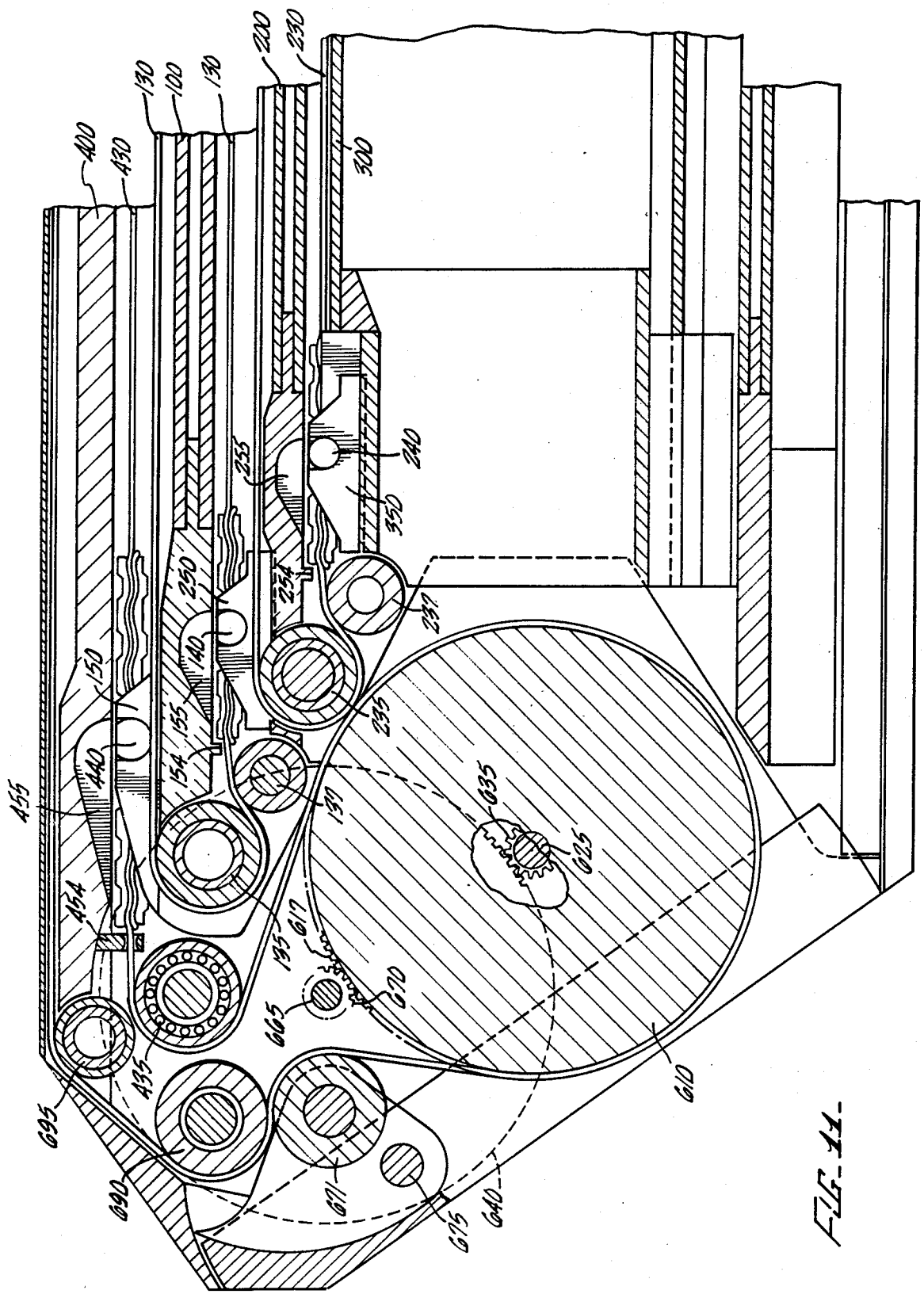
FIG. 11 is a cross section of the rear end of a fully retracted crane illustrating the driving mechanism.

The crane 10 is extended by a motorized drive mechanism described with reference to FIGS. 11, 12, and 13. FIG. 11 illustrates a cross-sectional side view of the drive mechanism. FIG. 11 shows the rear ends of camera beams 100, 200, 300 and main center beam 400 in the assembled condition and in a fully retracted position. Third camera beam 300 is connected within second camera beam 200. Lower pin assembly 240 on strap 230 is secured within pin cradle 350 providing the connection for third camera beam 300 to second camera beam 200. Strap 230 wraps around needle bearing 235 and is urged slightly upward by needle bearing 237 to provide additional room for third camera beam 300. Lower pin assembly 140 on strap 130 of the first camera beam is positioned in cradle 250 of the second camera beam 200. Strap 130 wraps around needle bearing 135 and is urged slightly upward by needle bearing 137 to provide additional clearance for second camera beam 200. Lower pin assembly 440 on strap 430 of main center beam 400 is positioned in cradle 150 of first camera beam 100. Strap 430 wraps around needle bearing 435, around drum 610, around tension compensating needle bearing 671, around needle bearing 690, and around needle bearing 695.

Figure 12:
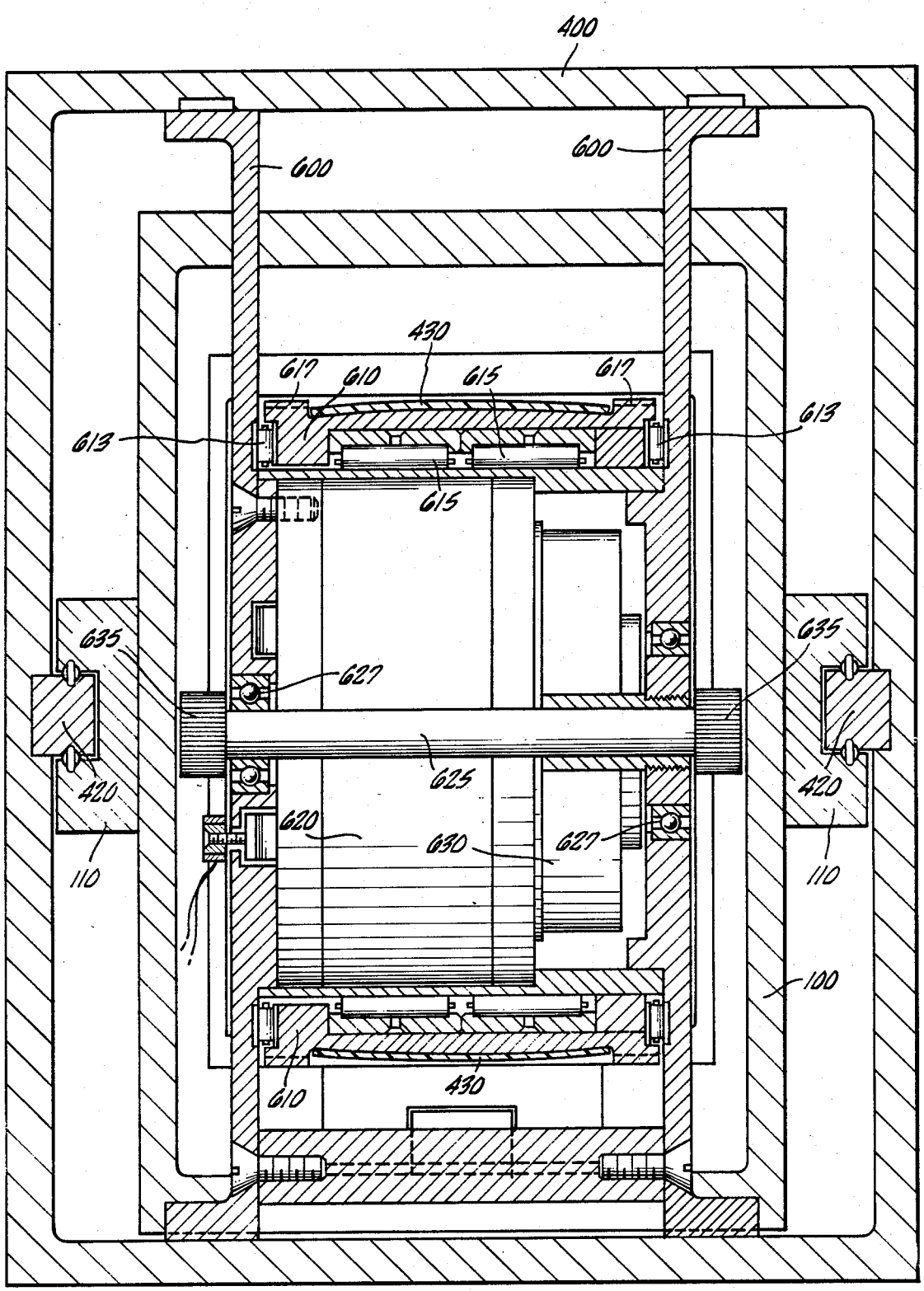

Crane 10 is telescoped by the action of a motor 620 located inside drum 610 as shown in FIG. 12. Motor 620 is secured to motor flanges 600, 600 which are in turn attached to main center beam 400. All of the drive components are contained within main center beam 400 providing the desired compactness in design. Motor 620 rotates motor shaft 625 which runs to both sides of motor 620. A motor tachometer 630 may be positioned adjacent motor 620 to monitor the speed of shaft 625. An optical encoder (not shown) may also be positioned to monitor the rotation of the strap 430. On each end of motor shaft 625 are pinion gears 635, 635. Motor shaft 625 rotates within motor shaft bearings 627, 627 attached to motor flanges 600, 600. Drum 610, coaxially positioned with motor shaft 625, rotates about motor shaft 625 on needle bearings 615, 615. The drum 610 is preferably coated on its outer surface with a hard rubber-like material to avoid slippage of strap 430 under typical use conditions. However, if the crane 10 strikes an obstruction during extension, drum 610 will allow some slippage of strap 430 to avoid damaging the unit. The surface of drum 610 adjacent to strap 430 is slightly convex in shape to maintain a centered position for strap 430.

Referring specifically to FIG. 13, main center beam 400 has motor flanges 600, 600 attached thereto. Linear bearings 110, 110 secured to the outer sides of first camera beam 100 run along guideway 420 attached to the inner sides of main center beam 400. Pinion gears 635, 635 rotate with motor shaft 625. Pinion gears 635, 635 in turn rotate large spur gears 640, 640 located on each end of synchronizing shaft 665. Synchronizing shaft 665 is rotatably supported by bearings 644, 644 which are connected to support flanges 605, 605. Attached to the inside of each large spur gear 640, 640 is a second spur gear 670, 670 also connectively attached to synchronizing shaft 665. Second spur gears 670, 670 receive additional support through bearings 642, 642 attached to motor flanges 600, 600. Second spur gears 670, 670 mesh with drum gears 617, 617 attached on either side of drum 610. Therefore, synchronizing shaft 665, second spur gears 670, 670, and large spur gears 640, 640 are interattached and rotate together.

The drive mechanism may also be viewed on FIG. 11. Motor shaft 625 rotates pinion gear 635 which meshes with and rotates large spur gears 640 which is rotating with synchronizing shaft 665. Also rotating with shaft 665 and large spur gear 640 is second spur gear 670. Second spur gear 670 meshes with and rotates drum gear 617 thereby turning drum 610.

Location of the motor 620 inside the drum 610 results in several advantages including:

(1) reducing the space required by the drive mechanism thereby minimizing the overall length of main center beam 400, and (2) permitting the beveled ends of camera beams 100, 200, 300 to partially wrap around drum 610 to minimize overall length of crane 10 in its fully retracted position thereby achieving a desirable high ratio between the fully extended length and the retracted length of crane 10.

Though the preferred embodiment locates the drive mechanism on strap 430, the interconnected beams 100-500 may be actuated by moving any beam or strap. Other beam moving methods such as engaging beam 100 with a hydraulic ram, are envisioned.

FIGS. 14, 14a, 14b, and 14c illustrate the automatic tension compensating mechanism of the present invention. When the crane 10 is tilted in an upward (as in FIG. 14b) or downward (as in FIG. 14c) position from horizontal, additional forces act on the straps 230, 130, 430 which tend to increase their length thereby affecting overall tension. The increases in length on straps 230 and 130 have insignificant effect on tension. However, when the crane 10 is tilted upward or downward at an angle of 60° (for example) from horizontal, the active force component of the counterweight structure 500 as well as the reaction of the camera beams 100, 200, 300 and camera mount 301, is exerted on the strap 430. A typical force would be about 270 kilograms. Such a force produces a 2.5 millimeter (0.1 inch) increase in the length of strap 430. As illustrated in FIGS. 14a-c, a compensating structure 672 and tension compensating bearing 671 pivot about pivot point 675. Depending upon the orientation of crane 10, the weight component of compensating weight structure 672 changes, such that as weight compensating structure 672 rotates about pivot point 675, tension compensating bearing 671 is pressed further against strap 430. Such action increases tension on strap 430 to compensate for the increase of length in the strap 430.

A suitable motor 620 for the present invention may have 250-450 watts at 3000 rpm. The preferred motor is a low inertia motor such as a disc-armature DC motor. Such a suitable motor is available from PMI Motors, a division of Kollmorgen Corporation, Syosset, N.Y., such as PMI model No. U12M4 or No. U12M4H.

The preferred total drive ratio between the rotation of the motor 620 and the rotation of the drum 610 is about 80. This ratio provides a minimum camera motion speed of about 1 mm/sec (1/25 in/sec). The maximum camera motion speed will be approximately 1 m/sec (3.3 ft/sec).

A very important aspect of the present invention is that the crane 10 is automatically counterbalanced during its telescoping action. Though only one method for achieving such automatic counterbalancing is described, other methods of counterbalancing are possible. For example, a telescoping shaft could run along the interior of the camera beams having a worm gear connected to a spur gear in each beam. The worm and spur gear combination connecting each beam will be sized with an appropriate ratio so that each beam moves the same distance relative to its adjacent beam. The counterweight structure will also move that same distance. Other methods of achieving the automatically counterbalanced scheme may include hydraulic actuation or separate electrical motor drives for each beam controlled by a central controller.

The preferred embodiment of the interconnecting means is the closed loop linkage mounted between two rollers. The rollers on all the beams are chosen of the same size and the beams are attached to accomplish the relative movement wherein as the counterweight structure moves a distance "d" each carried beam also moves a distance "d" from its respective carrying beam. This preferred arrangement results in a relative movement scheme which simplifies the balancing of the moments about the fulcrum point. Other more complicated movements schemes and methods of controlling relative movements are envisioned. For example, a computer program could be written inputting all of the weights and the distances of the center of gravities of the respective beams and the camera and then the computer program could calculate the total moment exerted by the beams and the camera and adjust the position of the counterweight structure accordingly. Alternately the balancing mechanism may include a measuring device possibly located near the fulcrum point 50 which measures the movement exerted by the extension of the camera beams 100, 200, 300. On the basis of the measurement, the counterweight structure can be moved accordingly to reduce the total moment toward zero. The preferred embodiment was chosen to avoid the complications associated with the alternate schemes.

Figure 15:
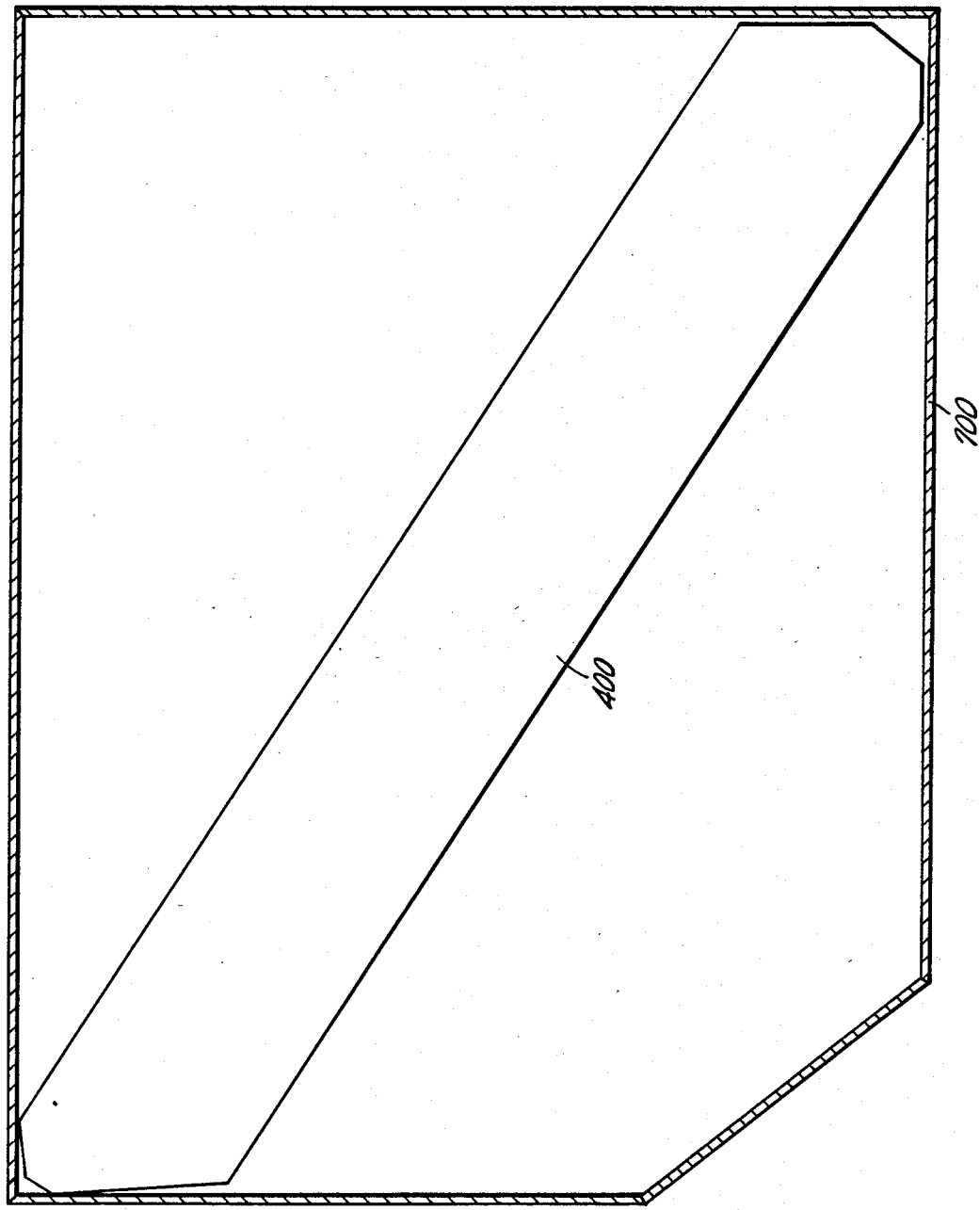
FIG. 15 illustrates the packing arrangement for components of the present invention within a standard aircraft container.

The present invention also has the feature of maximizing total extendable length while also being capable of disassembly and shipment within a standard aircraft shipping container (like the LD3: the LD3 is chosen because the next larger size container, the LD5, is twice the cost of an LD3) as in FIG. 15. Though the container 700 has a maximum length of 6'5", the shape of the beams 100, 200, 300, 400 are adapted to be placed diagonally across the container 700 to maximize the possible length of the beams. As such the beams may have a length of 7'4" and still fit within container 700. A 7'4" length for a beam remains in a manageable dimension.

The preferred shape of the rear of main center beam 400 (along with the attached motor 620, large spur gear 640, and the compensating structure 672) is chosen to maximize the length of main center beam 400 but fit closely into the upper or the lower corner of the aircraft container 700 when main center beam is placed diagonally. The front end of main center beam 400 is also preferably bevelled to fit into the bottom or upper corner of aircraft container 700. Similarly, the ends of first beam 100, second beam 200 and third beam 300 may also be bevelled to maximize their lengths while fitting diagonally.

The elements within each of the figures (except FIGS. 41a–c which have an exaggerated heights) are drawn to approximate scale. The preferred approximate dimensions of the beams are identified as follows:

Third camera beam 300 has a height of 142 mm (5.6");
Second camera beam 200 has a height of 195 mm (7.7");
First camera beam 100 has a height of 279 mm (11"); and
Main center beam 400 has a height of 345 mm (13.6").

FIG. 16 illustrates the camera stabilizing device 800 housed within camera mount arm 301 which serves as a means for correcting the orientation of a load carried by crane 10. Stabilizing mechanism 800 has a motor 820 which is capable of receiving a control signal to rotate a drive device which includes a shaft 815. A tachometer 821 may be connected to the shaft of motor 820 to monitor the motor speed. The motor 820 turns shaft 815 through gear box 825. A sensor such as an optical encoder 827 may be placed on shaft 815 and thereby worm gear 840. On the end of shaft 815 is worm gear 840 which engages worm wheel 850. Worm wheel 850 is supported and rotates about pivot point 810 on camera mount tip 805 of camera mount 301. As crane 10 is tilted up or down, a sensor 70 as shown in FIG. 2 (such as an optical encoder) monitors the angular deviation of beam 400 around fulcrum point 50. The signal from sensor 70 is transmitted to motor 820 which can then adjust the horizontal position of mounting head 860 (see FIG. 2) by rotating worm wheel 850.

In U.S. Pat. No. 3,788,585 a mechanical transmission was used to adjust the level of the camera while the crane was tilting. In the present invention with its telescoping action, the preferred means for correcting the orientation of the load is the motor and sensor system described above. However, it is conceivable that a mechanical system, similar to that described in the U.S. Pat. No. 3,788,585 (hereby incorporated by reference) may be adapted in which the mechanical drive also undergoes a telescoping action.

Thus, a crane for moving and supporting objects has been disclosed. While embodiments and applications of this invention have been shown and described, it would be apparent to those skilled in the art that many more uses and modifications are possible without departing from the inventive concepts herein. The invention, therefore, is not to be restricted except in the spirit of the appended claims.

We claim:

1. A crane comprising:
a fulcrum support;
a main boom mounted on said fulcrum support, said main boom having a front end and a rear end;
a first beam telescopically extendable from the front end of said main boom;
a second beam telescopically extendable from said first beam;
a counterweight structure connected along the outside of the main boom and telescopically extendable out from the rear end of said main boom;
an interconnecting means between said main boom, said first beam, said second beam, and said counterweight structure controlling the relative movements thereof such that as said first beam and said second beam extend in one direction, said counterweight structure extends in the opposite direction thereby substantially maintaining balance about said fulcrum support.

2. A crane comprising:
a fulcrum support;
a main boom mounted on said fulcrum support, said main boom having a front end and a rear end;
a first beam telescopically extendable from the front end of said main boom;
a second beam telescopically extendable from said first beam;
a third beam telescopically extendable from said second beam;
a counterweight structure connected along the outside of the main boom and telescopically extendable out from the rear end of said main boom;
an interconnecting means between said main boom, said first beam, said second beam, said third beam, and said counterweight structure controlling the relative movements thereof such that as said first beam, said second beam, and said third beam extend in one direction, said counterweight structure extends in the opposite direction thereby substantially maintaining balance about said fulcrum support.

3. A crane according to claim 2 wherein said interconnecting means comprises:
a main flexible closed loop linkage mounted between two main rollers on opposite ends of said main boom, said main linkage having a main top connecting element and a main bottom connecting element thereon positioned between said main rollers;
a first flexible closed loop linkage mounted between two first rollers on opposite ends of said first beam, said first linkage having a first top connecting element and a first bottom connecting element positioned between said first rollers; and
a second flexible closed loop linkage mounted between two second rollers on opposite ends of said second beam, said second linkage having a second top connecting element and a second bottom connecting element positioned between said second rollers;
wherein said counterweight structure is detachably connected to said main linkage at said main top connecting element;
wherein said main boom is detachably connected at its front end to said first linkage at said first top connecting element;
wherein said first beam is detachably connected at its rear end to said main linkage at said main bottom connecting element and at its front end to said second linkage at said second top connecting element;
wherein said second beam is detachably connected at its rear end to said first linkage at said first bottom connecting element;
wherein said third beam is detachably connected at its rear end to said second linkage at said second bottom connecting element.

4. A crane according to claim 2 wherein said interconnecting means comprises:
a means which controls the relative movements of said first beam, said second beam, said third beam, and said counterweight structure such that as said first beam moves a distance "d" from said fulcrum support, said second beam also moves a distance "d" from said first beam, said third beam also moves a distance "d" from said second beam, and said counterweight structure moves a distance "d" from said fulcrum support.

5. A crane according to claim 3 further comprising a drive mechanism for extending and retracting said beams, said drive mechanism comprised of a motor and a transmission coupling said motor to one of said flexible linkages.

6. A crane according to claim 3 wherein said flexible linkage comprises a flexible strap or belt.

7. A crane according to claim 6 wherein said strap or belt is comprised of an aramid fiber material.

8. A crane according to claim 2 wherein said beams are detachably connectable to permit the crane to be assembled and dismantled.

9. A crane according to claim 2 wherein said counterweight structure, said main boom and said beams are arranged in carrying/carried combinations such that a carried beam telescopically extends out from its respective carrying beam.

10. A crane according to claim 9 wherein said interconnecting means comprises:
a means which controls the relative movements of said first beam, said second beam, said third beam, and said counterweight structure such that as said counterweight structure moves a distance "d" from said support, each carried beam also moves a distance "d" from its respective carrying beam.

11. A crane according to claim 9 wherein each carrying/carried combination of said beams is comprised of at least one guideway attached to one of the carrying/carried combination with one or more bearings, corresponding to each guideway, attached to the other of the carrying/carried combination.

12. A crane according to claim 11 wherein the carrying/carried combination for said beams is comprised of a guideway attached to the carrying beam and two corresponding linear bearings attached to the carried beam.

13. A crane according to claim 2 wherein said main boom is pivotally mounted on said support to permit the raising and lowering of a load carried by said crane.

14. A crane according to claim 13 further comprising a means for correcting the orientation of a load carried by the crane in response to the pivoting of said crane.

15. A crane according to claim 14 wherein said means for correcting comprises:
a sensor means for sensing the pivoting of said crane;
an adjusting means for adjusting the orientation of said load; and
a transmission means for transmitting a signal from the sensor means to said adjusting means such that said adjusting means may compensate for the pivoting of said crane.

16. A crane according to claim 2 wherein said main boom, said first beam and said second beam are substantially hollow; and wherein said first beam slidably fits within and is supported by said main boom, said second beam slidably fits within and is supported by said first beam and said third beam slidably fits within and is supported by said second beam, wherein said counterweight structure moves along the exterior of said main boom and has a U-shaped cross section to allow clearance about said main boom.

17. A crane according to claim 1 wherein the bottom connecting element of the main flexible closed loop linkage is detachably connected to the rear end of the first beam by tensioning of the main flexible closed loop linkage, the first bottom connecting element is detachably connected to the rear end of the second beam by tensioning of the first flexible closed loop linkage and the second bottom connecting element is detachably connected to the rear end of the third beam by tensioning of the second flexible closed loop linkage.

18. A crane according to claim 3 further comprising:
a tensioning means for each flexible linkage, said tensioning means comprising:
an eccentric operably connected to one of said two rollers such that as said eccentric is rotated, the distance between the two rollers is varied; and
a handle connected to and for rotating said eccentric.

19. A crane comprising:
a fulcrum support;
a main boom mounted on said fulcrum support, said main boom having a front end and a rear end;
a first beam telescopically extendable from the front end or said main boom;

a second beam telescopically extendable from said first beam;

a third beam telescopically extendable from said second beam;

a counterweight structure telescopically extendable out from the rear end of said main boom;

an interconnecting means between said main boom, said first beam, said second beam, said third beam, and said counterweight structure controlling the relative movements thereof such that as said first beam, said second beam, and said third beam extend in one direction, said counterweight structure extends in the opposite direction thereby substantially maintaining balance about said fulcrum support; said interconnecting means comprising:

a main flexible closed loop linkage mounted between two main rollers on opposite ends of said main boom, said main linkage having a main top connecting element and a main bottom connecting element thereon positioned between said main rollers;

a first flexible closed loop linkage mounted between two first rollers on opposite ends of said first beam, said first linkage having a first top connecting element and a first bottom connecting element positioned between said first rollers; and a second flexible closed loop linkage mounted between two second rollers on opposite ends of said second beam, said second linkage having a second top connecting element and a second bottom connecting element positioned between said second rollers; and a tensioning means for each flexible linkage wherein the beams are remotely interconnected through the tensioning of said flexible linkage, wherein said counterweight structure is detachably connected to said main linkage at said main top connecting element;

wherein said first beam is detachably connected at its rear end to said main linkage at said main bottom connecting element and at its front end to said second linkage at said second top connecting element;

wherein said second beam is detachably connected at its rear end to said first linkage at said first bottom connecting element;

wherein said third beam is detachably connected at its rear end to said second linkage at said second bottom connecting element.

20. A crane comprising:

a fulcrum support;

a main boom mounted on said fulcrum support, said main boom having a front end and a rear end;

a first beam telescopically extendable from the front end of said main boom;

a second beam telescopically extendable from said first beam;

a third beam telescopically extendable from said second beam;

a counterweight structure telescopically extendable out from the rear end of said main boom;

an interconnecting means between said main boom, said first beam, said second beam, said third beam, and said counterweight structure controlling the relative movements thereof such that as said first beam, said second beam, and said third beam extend in one direction, said counterweight structure extends in the opposite direction thereby substantially maintaining balance about said fulcrum support; said interconnecting means comprising:

a main flexible closed loop linkage mounted between two main rollers on opposite ends of said main boom, said main linkage having a main top connecting element and a main bottom connecting element thereon positioned between said main rollers;

a first flexible closed loop linkage mounted between two first rollers on opposite ends of said first beam, said first linkage having a first top connecting element and a first bottom connecting element positioned between said first rollers; and a second flexible closed loop linkage mounted between two second rollers on opposite ends of said second beam, said second linkage having a second top connecting element and a second bottom connecting element positioned between said second rollers; and a tensioning means for each flexible linkage, said tensioning means comprising: an eccentric operably connected to one of said two rollers such that as said eccentric is rotated, the distance between the two rollers is varied; and a handle connected to and for rotating said eccentric;

wherein said counterweight structure is detachably connected to said main linkage at said main top connecting element;

wherein said first beam is detachably connected at its rear end to said main linkage at said main bottom connecting element and at its front end to said second linkage at said second top connecting element;

wherein said second beam is detachably connected at its rear end to said first linkage at said first bottom connecting element;

wherein said third beam is detachably connected at its rear end to said second linkage at said second bottom connecting element;

wherein the tensioning means actuates the bottom connecting element to connect to the rear end of the beam.

21. A crane comprising:

a fulcrum support;

a main boom mounted on said fulcrum support, said main boom having a front end and a rear end;

a first beam telescopically extendable from the front end of said main boom;

a second beam telescopically extendable from said first beam;

a third beam telescopically extendable from said second beam;

a counterweight structure extendable from the rear end of said main boom;

an interconnecting means between said main boom, said first beam, said second beam, said third beam, and said counterweight structure controlling the relative movements thereof such that as said first beam, said second beam, and said third beam extend in one direction, said counterweight structure extends in the opposite direction thereby substantially maintaining balance about said fulcrum support; said interconnecting means comprising:

a main flexible closed loop linkage mounted between two main rollers on opposite ends of said main boom, said main linkage having a main top connecting element and a main bottom connecting element thereon positioned between said main rollers;

a first flexible closed loop linkage mounted between two first rollers on opposite ends of said first beam, said first linkage having a first top connecting element and a first bottom connecting element positioned between said first rollers; and a second flexible closed loop linkage mounted between two second rollers on opposite ends of said second beam, said second linkage having a second top connecting element and a second bottom connecting element positioned between said second rollers; and a tensioning means for each flexible linkage, said tensioning means comprising: an eccentric operably connected to one of said two rollers such that as said eccentric is rotated, the distance between the two rollers is varied; and a handle connected to and for rotating said eccentric;

wherein said interconnecting means further comprises: a cam attached to said handle such that as said handle is pulled downward, said cam actuates a mating element into the top connecting element;

wherein said counterweight structure is detachably connected to said main linkage at said main top connecting element;

wherein said first beam is detachably connected at its rear end to said main linkage at said main bottom connecting element and at its front end to said second linkage at said second top connecting element;

wherein said second beam is detachably connected at its rear end to said first linkage at said first bottom connecting element;

wherein said third beam is detachably connected at its rear end to said second linkage at said second bottom connecting element.

22. A crane comprising:
a fulcrum support;
a main boom mounted on said fulcrum support, said main boom having a front end and a rear end;
a first beam telescopically extendable from the front end of said main boom;
a second beam telescopically extendable from said first beam;
a third beam telescopically extendable from said second beam;
a counterweight structure extendable from the rear end of said main boom;
an interconnecting means between said main boom, said first beam, said second beam, said third beam, and said counterweight structure controlling the relative movements thereof such that as said first beam, said second beam, and said third beam extend in one direction, said counterweight structure extends in the opposite direction thereby substantially maintaining balance about said fulcrum support; said interconnecting means comprising:
a main flexible closed loop linkage mounted between two main rollers on opposite ends of said main boom, said main linkage having a main top connecting element and a main bottom connecting element thereon positioned between said main rollers;

first flexible closed loop linkage mounted between two first rollers on opposite ends of said first beam, said first linkage having a first top connecting element and a first bottom connecting element positioned between said first rollers; and a second flexible closed loop linkage mounted between two second rollers on opposite ends of said second beam, said second linkage having a second top connecting element and a second bottom connecting element positioned between said second rollers;

a tensioning means for each flexible linkage, said tensioning means comprising: an eccentric operably connected to one of said two rollers such that as said eccentric is rotated, the distance between the two rollers is varied; and a handle connected to and for rotating said eccentric; and means for preventing assembly of beams unless said flexible linkages have been properly tensioned;

wherein said counterweight structure is detachably connected to said main linkage at said main top connecting element;

wherein said first beam is detachably connected at its rear end to said main linkage at said main bottom connecting element and at its front end to said second linkage at said second top connecting element;

wherein said second beam is detachably connected at its rear end to said first linkage at said first bottom connecting element, wherein said third beam is detachably connected at its rear end to said second linkage at said second bottom connecting element.

23. A crane according to claim 22 wherein said main boom and said beams are arranged in carrying/carried combinations such that a carried beam telescopically extends out from its respective carrying beam, and wherein said means for preventing assembly comprises mechanical stops in one or more carried beams, said stops having normally up positions which prevent insertion of a subsequent carried beam into the carried beam which has the stop unless the handle on the carrying beam has been pulled downward lowering said stop.

24. A crane according to claim 22 wherein said means for preventing assembly comprises a mechanical stop in said first beam having a normally up position which prevents insertion of said second beam into said first beam unless the handle of said main boom has been pulled downward lowering said stop.

25. A crane according to claim 22 wherein said means for preventing assembly further comprises a mechanical stop in said second beam having a normally up position which prevents insertion of said third beam unless the handle of said first beam has been pulled downward lowering said stop.

26. A crane according to claim 22 further comprising: a camera mount detachably connected to said third camera beam and wherein said means for preventing assembly comprises a mechanical stop in said third beam having a normally up position which prevents insertion of said camera mount into said third camera beam unless the handle of said second beam has been pulled downward lowering said stop.

27. A crane comprising:
a support;
a main boom mounted on said support, said main boom having a front end and a rear end;

one or more intermediate beams telescopically extendable from the front end of said main boom;

a last beam telescopically extendable from the last intermediate beam;

a counterweight structure connected along the outside of said main boom and telescopically extendable out from the rear end of said main boom; and an interconnecting means between said main boom, said intermediate beams, said last beam, and said counterweight structure such that as one beam extends in one direction, another beam or the counterweight structure extends in an opposite direction to compensate for any change in moment about the support thereby substantially maintaining balance about said support.

28. A crane according to claim 27 wherein said interconnecting means comprises:

a main flexible closed loop linkage mounted between two main rollers on opposite ends of said main boom, said main linkage having a main top connecting element and a main bottom connecting element thereon positioned between said main rollers; and on each of said intermediate beams, an intermediate flexible closed loop linkage mounted between two intermediate rollers on opposite ends of said intermediate beam, said intermediate linkage having an intermediate top connecting element and an intermediate bottom connecting element positioned between said intermediate rollers;

wherein said counterweight structure is detachably connected to said main linkage at said main top connecting element;

wherein said main boom, said intermediate beams, and said last beam are arranged in carrying/carried combinations such that a carried beam telescopically extends out from its respective carrying beam;

wherein each of said intermediate beams is detachably connected at its rear end at the bottom connecting element on the flexible closed loop linkage of its carrying beam;

wherein each of said intermediate beams except the last intermediate beam is detachably connected at its front end at the top connecting element on the closed loop linkage of its carried beam;

wherein said last beam is detachably connected at its rear end to the bottom connecting element on the last intermediate closed loop linkage.

29. A crane according to claim 28 wherein said interconnecting means further comprises a means for preventing connection of a carried beam to its respective carrying beam until the carrying beam has been properly connected to its respective carrying beam.

30. A crane according to claim 27 wherein said main boom is pivotally mounted on said support to permit the raising or lowering of a load carried by the crane, the crane further comprising: a tension compensating mechanism operating on said main flexible closed loop linkage which adjusts the tension on said linkage as said main boom pivots on said support.

31. A crane according to claim 28 wherein said main boom has a shape with bevelled ends adapted to fit diagonally across a standard aircraft shipping container to maximize the length of said main boom while fitting within the standard aircraft shipping container.

32. A crane comprising:
a support;

a main boom mounted on said support, said main boom having a front end and a rear end;

a plurality of beams, #1 through #n, fitting and sliding within said main boom and within each other, said beams telescopically extendable from the front end of said main boom;

a counterweight structure connected along the outside of said main boom and telescopically extendable out from the rear end of said main boom; and an interconnecting means between said main boom, said plurality of beams, and said counterweight structure such that as said plurality of beams extend in one direction, said counterweight structure extends in an opposite direction thereby substantially maintaining balance about said support.

33. A crane according to claim 32 wherein said main boom is pivotally mounted on said support.

34. A crane according to claim 32 wherein said beams are in a carrying/carried combination such that a carried beam telescopically extends out from its respective carrying beam; and wherein said interconnecting means comprises a means which controls the relative movements of said plurality of beams and said counterweight structure such that as said counterweight structure moves a distance "d" from said support, each carried beam also moves a distance "d" from its respective carrying beam.

35. A crane according to claim 32 wherein said interconnecting means comprises:

a main flexible closed loop linkage mounted between two main rollers on opposite ends of said main boom, said main linkage having a main top connecting element and a main bottom connecting element thereon positioned between said main rollers;

a flexible linkage #1 forming a closed loop and mounted between two rollers #1 on opposite ends of beam #1, said linkage #1 having a top connecting element #1 and a bottom connecting element #1 positioned between said rollers #1;

a flexible linkage #2 forming a closed loop and mounted between two rollers #2 on opposite ends of beam #2, said linkage #2 having a top connecting element #2 and a bottom connecting element #2 positioned between said rollers #2;

a flexible linkage #n−1 forming a closed loop and mounted between two rollers #n−1 on opposite ends of beam #n−1, said linkage #n−1 having a top connecting element #n−1 and a bottom connecting element #n−1 positioned between said rollers #n−1;

wherein said counterweight structure is detachably connected to said main linkage at said main top connecting element;

wherein said main boom is detachably connected at its front end to said linkage #1 at said top connecting element #1;

wherein said beam #1 is detachably connected at its rear end to said main linkage at said main bottom connecting element and at its front end to said linkage #2 at said top connecting element #2;

wherein said beam #2 is detachably connected at its rear end to said linkage #1 at said bottom connecting element #1 and at its front end to said linkage #3 at said top connecting element #3;

wherein said beam #n−2 is detachably connected at its rear end to said linkage #n−3 at said bottom connecting element #n−3 and at its front end to said linkage #n−1 at said top connecting element #n−1;

wherein said beam #n−1 is detachably connected at its rear end to said linkage #n−2 at said bottom connecting element #n−2;

wherein said beam #n is detachably connected at its rear end to said linkage #n−1 at said bottom connecting element #n−1.

36. A crane according to claim 35 further comprising a tensioning means for each flexible linkage wherein the beams are interconnected through the tensioning of said flexible linkage, wherein the bottom connecting element of the main flexible closed loop linkage is detachably connected to the rear end of the first beam by tensioning of the main flexible closed loop linkage, the first bottom connecting element is detachably connected to the rear end of the second beam by tensioning of the first flexible closed loop linkage and the second bottom connecting element is detachably connected to the rear end of the third beam by tensioning of the second flexible closed loop linkage.

37. A crane comprising:
 a main boom having a front end and a rear end;
 a plurality of beams extending out from the front end of said main boom;
 a counterweight structure connected along the outside of said main boom and telescopically extending out from the rear end of said main boom;
 an interconnecting means between said main boom and said beams for extending and retracting said beams, said interconnecting means comprising a flexible linkage; and
 a drive mechanism comprising a drum operably connected to said flexible linkage and a motor positioned within said drum and operably connected thereto for rotating said drum.

38. A crane according to claim 37 wherein said flexible linkage is comprised of a closed loop strap which wraps partway around said drum and wherein rotation of the drum by the motor operates to rotate the closed loop strap thereby extending or retracting said beams from said main boom.

39. A crane according to claim 37 wherein said drum and said motor are positioned within said main boom.

40. A crane according to claim 39 wherein said beams are configured with beveled ends so that the beveled ends may partially surround said drum when said beams are in a retracted condition.

41. A crane comprising:
 a fulcrum support;
 a main boom mounted on said fulcrum support, said main boom having a front end and a rear end;
 a first beam telescopically extendable from the front end of said main boom;
 a second beam telescopically extendable from said first beam;
 a third beam telescopically extendable from said second beam;
 a counterweight structure telescopically extendable out from the rear end of said main boom;
 an interconnecting means between said main boom, said first beam, said second beam, said third beam, and said counterweight structure controlling the relative movements thereof such that as said first beam, said second beam, and said third beam extend in one direction, said counterweight structure extends in the opposite direction thereby substantially maintaining balance about said fulcrum support; said interconnecting means comprising:
  a main flexible closed loop linkage mounted between two main rollers on opposite ends of said main boom, said main linkage having a main top connecting element and a main bottom connecting element thereon positioned between said main rollers;
  a first flexible closed loop linkage mounted between two first rollers on opposite ends of said first beam, said first linkage having a first top connecting element and a first bottom connecting element positioned between said first rollers; and
  a second flexible closed loop linkage mounted between two second rollers on opposite ends of said second beam, said second linkage having a second top connecting element and a second bottom connecting element positioned between said second rollers; and
 a tensioning means for each flexible linkage, wherein the beams are interconnected through the tensioning of said flexible linkage, wherein (a) actuation of the tensioning means of the main flexible linkage actuates the main top connecting element to detachably connect to the front end of said counterweight structure, (b) actuation of the tensioning means of the first flexible linkage actuates the first top connecting element to detachably connect to the front end of main boom, and (c) actuation of the tensioning means of the second flexible linkage actuates the second top connecting element to detachably connect to the front end of said first beam,
 wherein said counterweight structure is detachably connected to said main linkage at said main top connecting element;
 wherein said first beam is detachably connected at its rear end to said main linkage at said main bottom connecting element and at its front end to said second linkage at said second top connecting element;
 wherein said second beam is detachably connected at its rear end to said first linkage at said first bottom connecting element;
 wherein said third beam is detachably connected at its rear end to said second linkage at said second bottom connecting element.

* * * * *

UNITED STATES PATENT AND TRADEMARK OFFICE
CERTIFICATE OF CORRECTION

PATENT NO. : 4,907,768
DATED : March 13, 1990
INVENTOR(S) : Alain O. F. MASSERON and Jean-Pierre LAVALOU It is certified that error appears in the above-identified patent and that said Letters Patent is hereby corrected as shown below:

In column 18, line 46, after the word "claim" change "1" to --19--.

In column 24, after line 46, insert the following:

-- .
.
. --

In column 24, after line 66, insert the following:

-- .
.
. --

Signed and Sealed this

Fourteenth Day of December, 1993

Attest:

BRUCE LEHMAN

*Attesting Officer*    *Commissioner of Patents and Trademarks*